US012739602B2

(12) United States Patent
Kumar et al.

(10) Patent No.: US 12,739,602 B2
(45) **Date of Patent: *Sep. 15, 2026**

(54) USER LOCATION AWARE SMART EVENT HANDLING

(71) Applicant: QUALCOMM Incorporated, San Diego, CA (US)

(72) Inventors: Akash Kumar, Hyderabad (IN); Sai Pradeep Venkatraman, Santa Clara, CA (US); Ankit Maheshwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,076

(22) Filed: Sep. 20, 2024

(65) Prior Publication Data

US 2025/0088828 A1 Mar. 13, 2025

Related U.S. Application Data

(63) Continuation of application No. 17/674,248, filed on Feb. 17, 2022, now Pat. No. 12,156,104, which is a (Continued)

(51) Int. Cl.
*H04W 4/12* (2009.01)
*H04L 67/30* (2022.01)
(Continued)

(52) U.S. Cl.
CPC ............... *H04W 4/12* (2013.01); *H04L 67/30* (2013.01); *H04L 67/52* (2022.05); *H04L 67/535* (2022.05);
(Continued)

(58) Field of Classification Search
CPC ......... H04W 4/00–06; H04W 4/12–14; H04W 4/18–185
See application file for complete search history.

(56) References Cited

U.S. PATENT DOCUMENTS 7,333,014 B2 2/2008 Agrawal et al.
7,495,544 B2 2/2009 Stilp
(Continued)

FOREIGN PATENT DOCUMENTS

CN 1591399 A 3/2005
CN 1859718 A 11/2006
(Continued)

OTHER PUBLICATIONS

International Preliminary Report on Patentability—PCT/US2017/065975 the International Bureau of WIPO—Geneva, Switzerland, Aug. 1, 2019.

(Continued)

*Primary Examiner* — San Htun
(74) *Attorney, Agent, or Firm* — Thien T. Nguyen

(57) ABSTRACT

Techniques are discussed herein for providing notification messages to a user are provided. An example method of providing an alert to a user in an environment with multiple devices includes determining a first notification device based at least in part on a location of the user and one or more notification preferences associated with the user, generating an alert message based at least in part on the first notification device, and sending the alert message to the first notification device.

15 Claims, 14 Drawing Sheets

Related U.S. Application Data continuation of application No. 15/407,550, filed on Jan. 17, 2017, now Pat. No. 11,297,470.

(51) Int. Cl.

| | |
|---|---|
| ***H04L 67/50*** | (2022.01) |
| ***H04L 67/52*** | (2022.01) |
| ***H04L 67/54*** | (2022.01) |
| ***H04L 67/55*** | (2022.01) |
| ***H04W 4/02*** | (2018.01) |
| ***H04W 4/021*** | (2018.01) |
| ***H04W 4/029*** | (2018.01) |
| ***H04W 4/30*** | (2018.01) |
| ***H04W 4/33*** | (2018.01) |
| ***H04W 4/38*** | (2018.01) |
| *H04W 4/20* | (2018.01) |
| *H04W 4/90* | (2018.01) |

(52) U.S. Cl.

CPC .............. *H04L 67/54* (2022.05); *H04L 67/55* (2022.05); *H04W 4/021* (2013.01); *H04W 4/025* (2013.01); *H04W 4/029* (2018.02); *H04W 4/30* (2018.02); *H04W 4/33* (2018.02); *H04W 4/38* (2018.02); *H04W 4/20* (2013.01); *H04W 4/90* (2018.02)

(56) References Cited

U.S. PATENT DOCUMENTS 8,350,694 B1 1/2013 Trundle et al.
8,533,612 B2 9/2013 Hochendoner et al.
8,890,685 B1* 11/2014 Sookman ................ H04W 4/90 340/539.13
8,988,243 B2 3/2015 Lee et al.
9,159,217 B1 10/2015 Logan et al.
9,194,937 B2 11/2015 Bahl et al.
9,642,167 B1 5/2017 Snyder et al.
11,297,470 B2 4/2022 Kumar et al.
2006/0116142 A1 6/2006 Cofta
2008/0079561 A1 4/2008 Trundle et al.
2008/0122609 A1 5/2008 Mannisto et al.
2010/0117849 A1 5/2010 Clayton et al.
2010/0210290 A1* 8/2010 Riley ................... G08B 27/006 455/41.3
2010/0289644 A1* 11/2010 Slavin .................... G08B 25/14 340/568.1
2011/0159837 A1 6/2011 Daly et al.
2012/0136573 A1 5/2012 Janardhanan et al.
2012/0214449 A1 8/2012 Jordan et al.
2012/0230244 A1 9/2012 Bienas et al.
2013/0346515 A1 12/2013 Deluca et al.
2014/0035726 A1 2/2014 Schoner et al.
2014/0067649 A1 3/2014 Kannan et al.
2014/0273911 A1* 9/2014 Dunn .................. H04L 65/1073 455/404.1
2014/0343994 A1 11/2014 Graff et al.
2015/0097683 A1* 4/2015 Sloo ...................... G01J 1/4204 340/628
2015/0163411 A1 6/2015 McCarthy, III et al.
2015/0296358 A1 10/2015 Akutsu
2015/0365787 A1 12/2015 Farrell
2016/0007179 A1 1/2016 Kim
2016/0100292 A1* 4/2016 Frank .................... H04W 4/025 455/418
2016/0183055 A1 6/2016 Mahajan et al.
2016/0262126 A1 9/2016 Hillier et al.
2016/0301373 A1 10/2016 Herman et al.
2017/0195856 A1 7/2017 Snyder et al.
2018/0206083 A1 7/2018 Kumar et al.
2022/0174456 A1 6/2022 Kumar et al.
2022/0353644 A1 11/2022 Kumar et al.

FOREIGN PATENT DOCUMENTS

CN 102404397 A 4/2012
CN 102740254 A 10/2012
CN 105227448 A 1/2016
CN 105357368 A 2/2016
CN 105472560 A 4/2016
CN 105682064 A 6/2016
CN 106101404 A 11/2016
CN 106101439 A 11/2016
CN 106210347 A 12/2016
CN 106296135 A 1/2017
WO 0169387 A2 9/2001
WO 0169387 A8 12/2001
WO 2015063000 A1 5/2015
WO 2015184359 A2 12/2015
WO 2015184359 A3 1/2016

OTHER PUBLICATIONS

International Search Report and Written Opinion—PCT/US2017/065975—ISA/EPO—Mar. 28, 2018.
Taiwan Search Report—TW106144156—TIPO—Apr. 6, 2021.

* cited by examiner

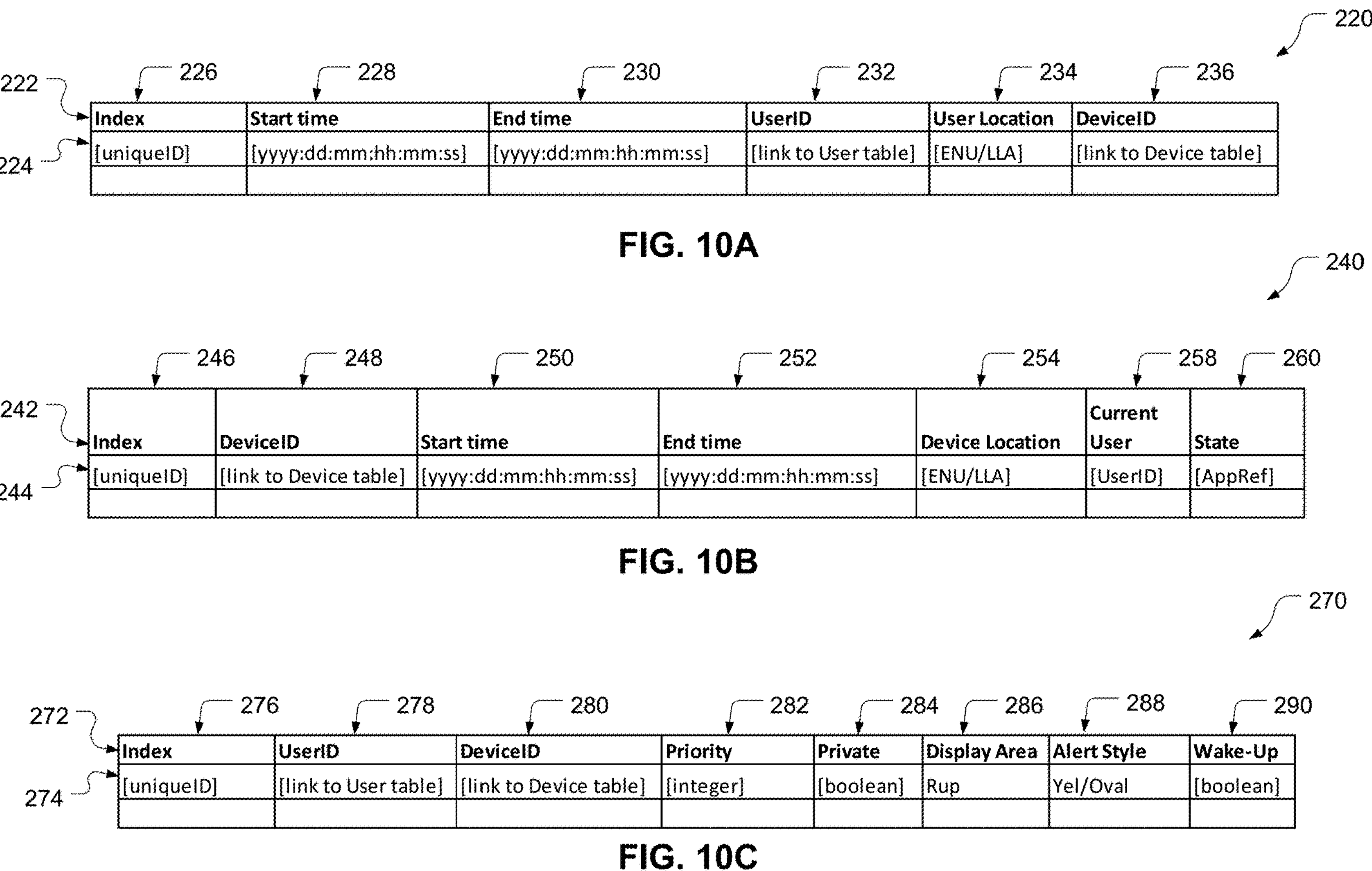

| Index | Start time | End time | UserID | User Location | DeviceID |
|---|---|---|---|---|---|
| [uniqueID] | [yyyy:dd:mm:hh:mm:ss] | [yyyy:dd:mm:hh:mm:ss] | [link to User table] | [ENU/LLA] | [link to Device table] |
| | | | | | |

FIG. 10A

| Index | DeviceID | Start time | End time | Device Location | Current User | State |
|---|---|---|---|---|---|---|
| [uniqueID] | [link to Device table] | [yyyy:dd:mm:hh:mm:ss] | [yyyy:dd:mm:hh:mm:ss] | [ENU/LLA] | [UserID] | [AppRef] |
| | | | | | | |

FIG. 10B

| Index | UserID | DeviceID | Priority | Private | Display Area | Alert Style | Wake-Up |
|---|---|---|---|---|---|---|---|
| [uniqueID] | [link to User table] | [link to Device table] | [integer] | [boolean] | Rup | Yel/Oval | [boolean] |
| | | | | | | | |

USER LOCATION AWARE SMART EVENT HANDLING

CROSS-REFERENCE TO RELATED APPLICATION

This application is a continuation of U.S. patent application Ser. No. 17/674,248, filed Feb. 17, 2022, entitled "USER LOCATION AWARE SMART EVENT HANDLING," which is a continuation of U.S. patent application Ser. No. 15/407,550, filed Jan. 17, 2017, now U.S. Pat. No. 11,297,470, entitled "USER LOCATION AWARE SMART EVENT HANDLING," which is assigned to the assignee hereof, and the entire contents of which are hereby incorporated herein by reference for all purposes.

BACKGROUND

Devices, both mobile and static, are increasingly equipped to wirelessly communicate with other devices and/or to take measurements from which their locations may be determined and/or locations may be determined of other devices from which one or more signals are received. An electronic notification process may be used to send notifications from one device to another device based on the locations of the devices. Locations of devices may be determined by the devices themselves, or by another device that is provided with the measurements, or by another device that takes the measurements. For example, a device may determine its own location based on satellite positioning system (SPS) signals, cellular network signals, and/or Wi-Fi signals, etc. that the devices receive. The location of a user may often be associated with the location of a mobile or static device, such as a mobile phone or a static work station. Notifications/alerts may be sent to a user based on an association with a mobile device. Associating a single user with a device can be problematic when devices may move or be shared by multiple users. For example, users may roam throughout a home with or without a mobile device and thus their location may not correspond to the location of a mobile device. For instance, a child may take their parent's mobile device to another room (i.e., without their parent) to play a game or view on-line content. In this example, the parent would be unaware of any notifications sent to the mobile device while the child is in possession of the mobile device.

To improve the efficiency of communications with a user, the location of the user should be considered in an electronic notification process. Further, the electronic notification process should also consider the mobility of some devices and the locations of mobile devices relative to the location of the user.

SUMMARY

An example of a method of sending an alert message according to the disclosure includes receiving, at a communication device, a notification message for a user, determining, by the communication device, a location of the user, determining, by the communication device, one or more notification devices based the location of the user, generating, by the communication device, the alert message based on one or more notification preferences associated with the user and the one or more notification devices, and sending, by the communication device, the alert message to at least one of the one or more notification devices based on the notification preferences.

Implementations of such a method may include one or more of the following features. The alert message may include an indication of the notification preferences. The communication device may be a central controller. Generating the alert message may include populating one or more data frames associated with a wireless messaging protocol. Determining the location of the user may include providing a user identification associated with the user to the central controller and receiving an indication of the location of the user from the central controller. At least one of the one or more notification devices may be configured to receive the alert message from a second notification device. The alert message may be a pending-notification message including information configured to enable the at least one of the one or more notification devices to display an icon associated with the user. Determining the location of the user may include executing a user search function. Determining the location of the user may include obtaining an image with a camera on at least one of the one or more notification devices.

An example of a device for providing an alert message to a user according to the disclosure includes at least one processor configured to receive a notification for the user, determine a location of the user, determine one or more notification devices based on the location of the user, determine one or more notification preferences associated with the user and the one or more notification devices, generate the alert message for at least one of the one or more notification devices based on the notification preferences, and a transceiver, communicatively coupled to the processor, configured to transmit the alert message wirelessly from the device.

Implementations of such a device may include one or more of the following features. The notification preferences may include a privacy preference indicating conditions in which a receiving notification device that receives the alert message may present the alert message. The notification preferences may include a display area preference indicating an area on a display in which a receiving notification device that receives the alert message will present the alert message. The notification preferences may include a volume level preference indicating a volume in which a receiving notification device that receives the alert message will present the alert message. The alert message may be a pending-notification message including information configured to enable the at least one of the one or more notification devices to display an icon associated with the user. The processor may be configured to receive information from at least one presence sensor and determine the location of the user based at least in part on the information received from the at least one presence sensor. The processor may be configured to receive an indication of the location of the user from the one or more notification devices.

An example of an apparatus for sending an alert message according to the disclosure includes means for receiving a notification message for a user, means for determining a location of the user, means for determining one or more notification devices based the location of the user, means for generating the alert message based on one or more notification preferences associated with the user and the one or more notification devices, and means for sending the alert message to at least one of the one or more notification devices based on the notification preferences.

An example of a non-transitory processor-readable storage medium comprising processor-readable instructions configured to cause one or more processors to send an alert message according to the disclosure includes code for receiving a notification message for a user, code for determining a location of the user, code for determining one or more notification devices based the location of the user, code for generating the alert message based on one or more notification preferences associated with the user and the one or more notification devices, and code for sending the alert message to at least one of the one or more notification devices based on the notification preferences.

Items and/or techniques described herein may provide one or more of the following capabilities, as well as other capabilities not mentioned. Electronic notifications/alerts may be provided based on the location of a user. The location of the user may be established based on sensor and device information. The locations of users and devices may be stored with chronological information. Notifications may be provided to one or more devices that are proximate to the current location of the user. The notifications may be provided based on user preferences and/or attributes of the devices. User preferences and device attributes may be stored on a control system. A single device may be configured to provide multiple notifications based on the preferences of multiple users. Emergency notifications may be provided to multiple devices regardless of the user location. The location of a user may be based on historical data. Other capabilities may be provided and not every implementation according to the disclosure must provide any, let alone all, of the capabilities discussed.

BRIEF DESCRIPTION OF THE DRAWINGS

FIGS. 10A-10C are example data tables of device and user data history maintained by the central controller shown in FIG. 8.

Figure 12:
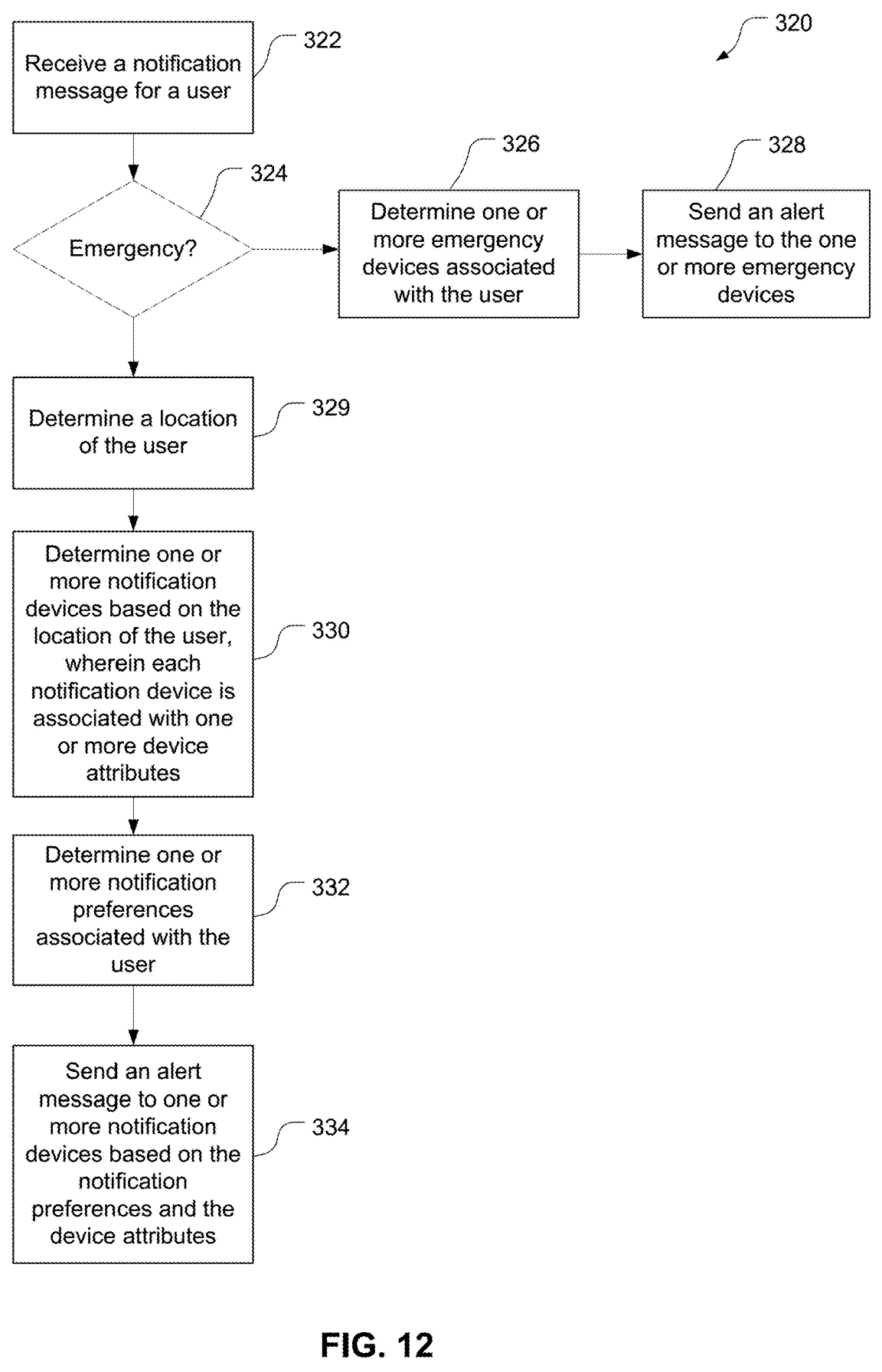

FIG. 12 is a block flow diagram of method of sending an alert message to a notification device.

DETAILED DESCRIPTION

Techniques are discussed herein for providing notification messages to a user. An increasing number of household smart devices are becoming available to the consumer market. These smart devices are capable of communicating with a home network to store and exchange data. Historically, an individual in one area of a house may have no idea of what is happening in other areas of the house. For example, if the individual is operating an appliance in one area of the home (e.g., a washing machine), they may be oblivious to the status of an appliance operating in another area of the home that requires their immediate attention (e.g., the stove). In another example, if the individual leaves a smart device (e.g., smartphone, tablet) in one area, they may not hear a notification tone from the smart device (e.g., incoming message, email, alerts). Location determination of the individual in the home enables the individual to take suitable actions to ensure that important calls/notifications/alerts are not missed. For example, a device that needs any immediate attention may be able to communicate with the individual even when they are not in the vicinity of that device.

A smart home may include a network of devices capable of exchanging information with other devices on the network. The smart devices may also be used to determine a user's location within the home. For example, a voice identification system may be used to identify individual users and associate each user to a device or physical location. Other presence sensors such as cameras and motions detectors may be used to determine the location of the user. Other smart devices on the network may require a user ID and thus may be used to infer the user's location. A network controller can maintain a data table with user location information. The user location information can be correlated to a proximate network device and notifications for a specific user may be directed to a proximate device. In an example, if the user is watching TV and does not have his smartphone with him, they could receive alerts about a security alarm at the front door via the TV. In another example, if system detects that the user is some distance away from their smartphone, the smartphone may increase the notification volume automatically.

Figure 1:
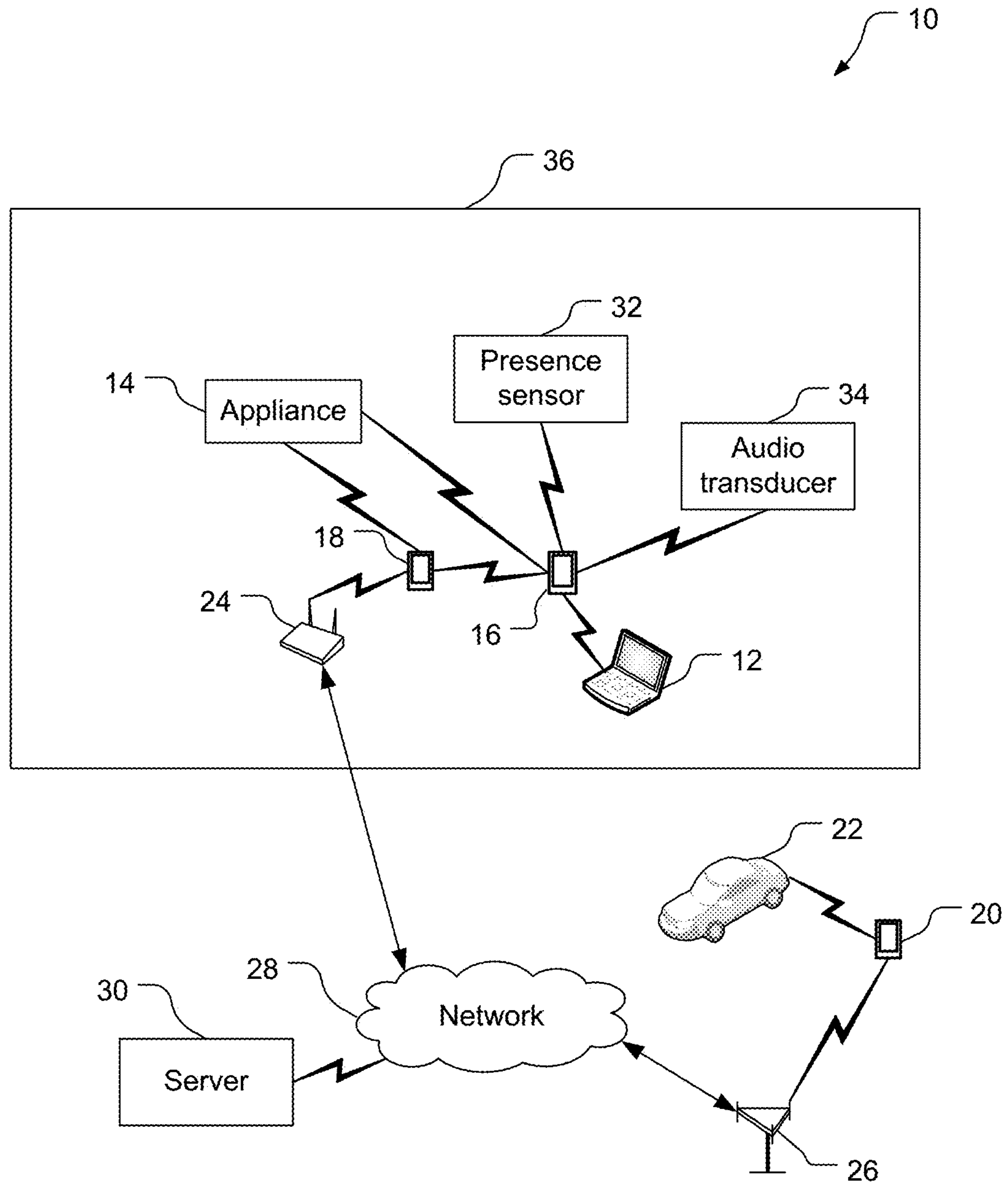
FIG. 1 is a simplified view of a communication system.

Referring to FIG. 1, a communication system 10 includes devices 12, 14, 16, 18, 20, 22, an access point 24, a base station 26, a network 28, a server 30, a presence sensor 32, and an audio transducer 34. The devices 12, 14, 16, 18, the access point 24, the presence sensor 32, and the audio transducer 34 are disposed inside a structure 36 (e.g., a building). The system 10 is a communication system in that components of the system 10 can communicate with one another directly or indirectly, e.g., via the network 28 and/or the access point 24 and/or the base station 26 (or other access points and/or other bases stations not shown). The system 10 is a communication system in that at least some of the components of the system 10 can communicate with one another wirelessly. For example, the base station 26 and the device 20 may communicate wirelessly using signals according to one or more protocols such as LTE, GSM, CDMA, or OFDM. The single access point 24 and the single base station 26 are examples only, and other quantities of access points and/or base stations may be used. Also, the types of the devices 12, 14, 16, 18, 20, 22 (e.g., an appliance, a smart phone, a tablet computer, a laptop computer, and a car) are examples and other types of devices may be used, whether currently existing or developed in the future. The term "base station" does not limit the base station 26 to any particular form, protocol, etc. For example, any of the base station 26 (and/or other base stations not shown) may be referred to as a base transceiver station (BTS), an access node (AN), a Node B, an evolved Node B (eNB), etc. Further, the device 22 is a car and while the primary function of a car is not as a communication device, the car will comprise a communication device as a part of the car, and for simplicity of the disclosure the car is considered as one type of communication device herein.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include BLUETOOTH communications, BLUETOOTH Low-Energy communications, and Wi-Fi communications. The devices 12, 14, 16, 18, 20, 22 may broadcast information, and/or may relay information from one of the devices 12, 14, 16, 18, 20, 22 to another or to another device such as the access point 24 and/or the base station 26. One or more of the devices 12, 14, 16, 18, 20, 22 may include multiple types of radios, e.g., a BLUETOOTH radio, a Wi-Fi radio, a cellular radio (e.g., LTE, CDMA, 3G, 4G, etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26.

Figure 2:
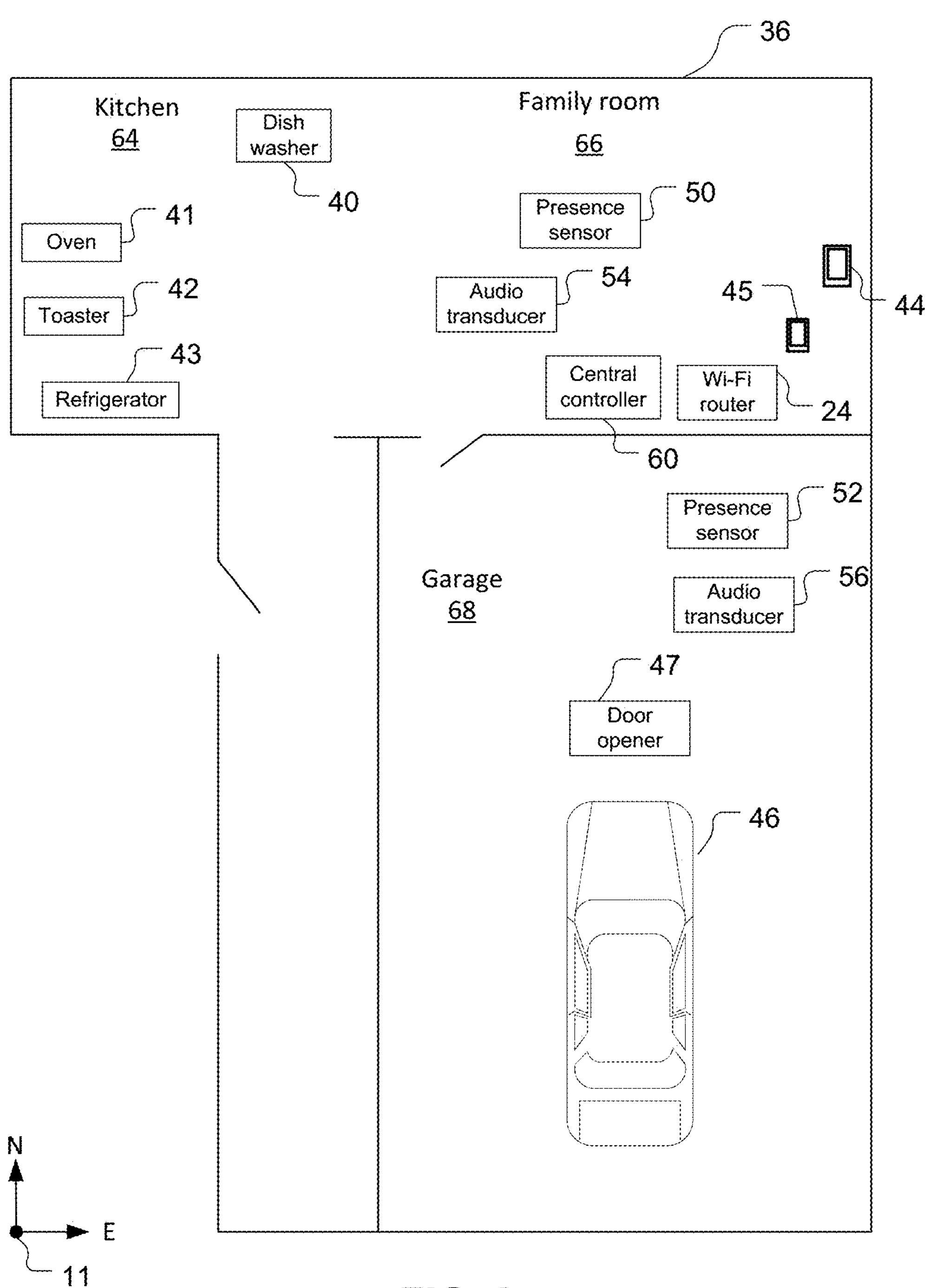
FIG. 2 is a simplified top view of an indoor portion of an example communication system.

Referring to FIG. 2, and indoor portion of the system 10 inside of the structure 36 includes wireless communication devices 40, 41, 42, 43, 44, 45, 47, presence sensors 50, 52, audio transducers 54, 56, a central controller 60, and the access point 24 (here a Wi-Fi router). In this example, the devices 40-47 include a dishwasher 40, an oven 41, a toaster 42, and a refrigerator 43 disposed in a kitchen 64, a tablet 44, a smart phone 45, and a television disposed in a family room 66, and a car 46 and a garage door opener 47 disposed in a garage 68. These devices 40-47 are configured to communicate with each other if within communication range of each other, and to communicate with the presence sensors 50, 52 and the central controller 60. Using the communication capabilities between each other, information regarding the devices 40-47 may be sent to each other, relayed to other devices, or even relayed to the central controller 60. Further, communications from the central controller 60 may be received by, or forwarded by, the devices 40-47. Further still, the central controller 60 may be a standalone device as shown in FIG. 2 or may be incorporated into any of the devices 40-47. The system 10, in this example, provides an IoT network that can generate, send, receive, relay or forward, various information (e.g., attributes, attribute tables, information relating to attributes, signal measurements, location indications, etc.) to facilitate functionality described herein. The devices 40-47 are examples only, and other types of devices, as well as other quantities of devices, may be used.

The presence sensors 50, 52 facilitate detection of the presence of devices and/or users. The presence sensors 50, 52 may detect the presence of devices and/or persons in any of a variety of ways. For example, either or both of the presence sensors 50, 52 may comprise a movement sensor, e.g., that sends signals, measures their reflections, and compares present reflections with previous reflections. The signals may be visible or non-visible (e.g., infrared) light signals and audible or non-audible (e.g., ultrasound) sound signals. Either or both of the presence sensors 50, 52 may comprise a heat sensor, e.g., including an infrared sensor. Either or both of the presence sensors 50, 52 may be communicatively coupled (e.g., hard-wired or wirelessly in communication with) one or more of the devices 40-47 and/or the central controller 60. The presence sensors 50, 52 are configured to report the detection of presence (possibly only if new, or possibly new and ongoing) of a relevant object such as a person.

The audio transducers 54, 56 facilitate the reception and provision of commands from users to the central controller 60 or other appropriate device. The audio transducers are preferably communicatively coupled (e.g., hard-wired or in wireless communication with) the central controller 60 and are configured to receive verbal commands, convert these commands to electrical signals, and send the signals to the central controller 60 or other appropriate device. The audio transducers 54, 56 may send the signals to the central controller 60 or other appropriate device directly or indirectly (e.g., through one or more intermediate devices that relay the signals) such as one or more of the devices 40-47.

Figure 3:
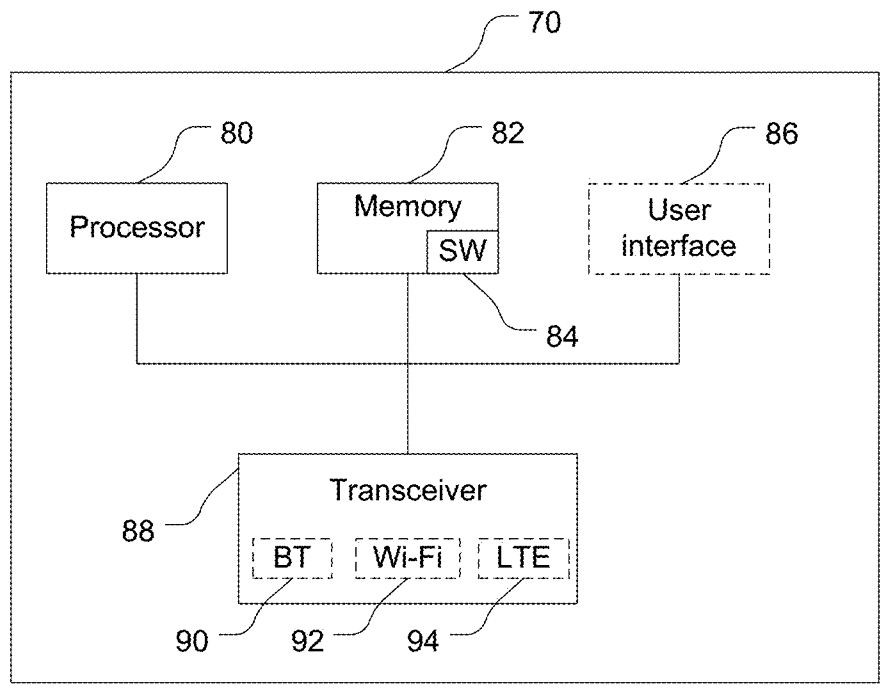
FIG. 3 is a block diagram of components of communication device shown in FIG. 2.

Referring to FIG. 3, with further reference to FIG. 1, an example communication device 70 comprises a computer system including a processor 80, a memory 82 including software (SW) 84, an optional user interface 86, and a transceiver 88. The processor 80 is preferably an intelligent hardware device, for example a central processing unit (CPU) such as those made or designed by Qualcomm®, ARM®, Intel® Corporation, or AMD®, a microcontroller, an application specific integrated circuit (ASIC), etc. The processor 80 may comprise multiple separate physical entities that can be distributed in the device 70. The processor 80 may be at least one processor or multiple processors (including multicore processors). The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the user interface 86 (as appropriate), and/or the transceiver 88 provide means for performing functions as described herein, for example, means for generating communications with device attributes and causing the transceiver 88 to transmit these communications wirelessly from the device 70, means for receiving communications from other devices, means for transmitting communications to other devices including relaying at least portions of received communications (e.g., forwarding/sending portions of received communications), and means for determining various information such as position of the device 70, relative distance from the device 70 to another device, angle of arrival of a signal at the device 70, a change in position of another device with a mobility status of "static," etc. The software 84 can be loaded onto the memory 82 by being downloaded via a network connection, uploaded from a disk, etc. The device 70 may be any of the devices 40-47 shown in FIG. 2, or another device. The user interface 86 (e.g., a display and/or a microphone and speaker) is optional, e.g., with the tablet 44 and the smart phone 45 including a display, a microphone, and a speaker while the garage door opener 47 does not (typically) include a display, a microphone, or a speaker, although the garage door opener 47 may include a user interface of some sort, e.g., switches operable by a user.

The transceiver 88 is configured to send communications wirelessly from the device 70 and to receive wireless communications into the device 70, e.g., from the devices 40-47, the access point 24, or the central controller 60. Thus, the transceiver 88 includes one or more wireless communication radios. In the example shown in FIG. 3, the transceiver 88 optionally includes a BLUETOOTH radio 90, a Wi-Fi radio 92, and a long-term evolution (LTE) radio 94. As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the devices 40-47 or to another device such as the access point 24. Thus, for example, the device 70 may receive a wireless communication using the BLUETOOTH radio 90, and forward the communication using the Wi-Fi radio 92 to another device that does not include a BLUETOOTH radio.

The processor 80 is configured to relay communications between devices, for example, from the central controller 60 the devices 40-47 or from the devices 40-47 to the central controller. For example, the processor 80 may receive, via the transceiver 88, the request from the central controller 60 (directly or indirectly, e.g., from another of the devices 40-47) for the location of one of the devices 40-47. The processor 80 may relay the request to one or more of the devices 40-47 within communication range of the device 70. The processor 80 is further configured to relay a reply from any of the devices 40-47 to the central controller 60, or to another device for further relay until the reply reaches the central controller 60. The reply, for example, may be a location of a target device, and the location may be a distance relative to another device, for example from the device from which the reply is received.

Figure 4:
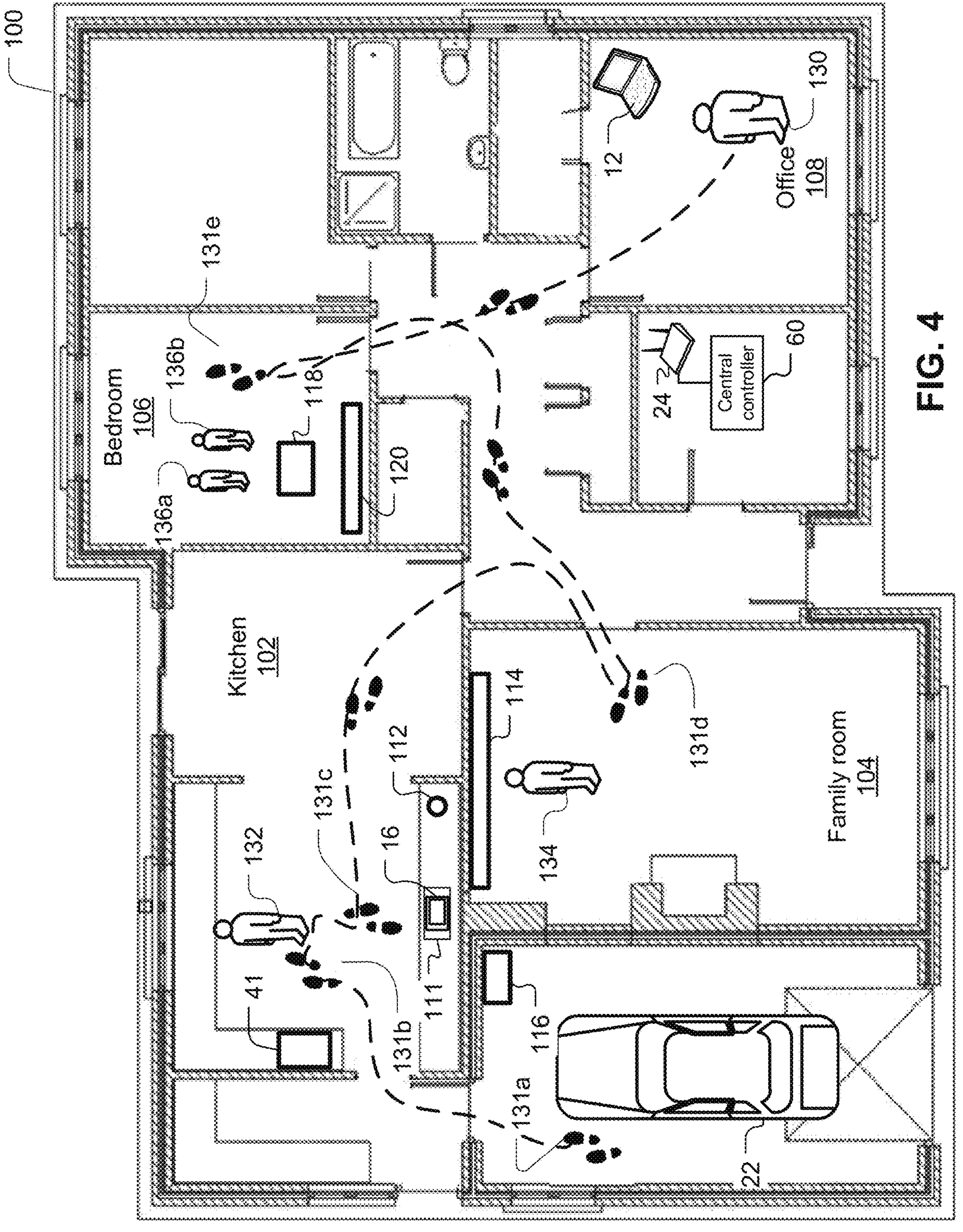
FIG. 4 is an example use case of a mobile user in a household communication system.

Referring to FIG. 4, with further reference to FIG. 2, an example use case of a mobile user 130 in a household communication system is shown. The household communication system is shown in the context of a home 100. The home 100 and the devices and users therein are exemplary only, and not a limitation. The home 100 includes a kitchen 102, a family room 104, a bedroom 106 and an office 108. The household communication system includes an access point 24 and a central controller 60 which may be the same device (e.g., the central controller 60 may include the access point 24). Example devices within the home 100 include a laptop device 12, a mobile device 16 (e.g., belonging to the user 130), an automobile 22, an oven 41, a charging station 111, a networked speaker device 112, a television 114, a smart circuit breaker box 116, a gaming console 118 with a monitor 120. Each of the devices 12, 16, 22, 41, 111, 112, 114, 116, 118, 120 may be a device 70 and are configured to communicate with the central controller 60 (e.g., via the access point 24). The home 100 also includes other individuals including a spouse 132, an elder child 134 and the younger children 136*a*, 136*b*.

The following operational use cases are provided as examples to facilitate the explanation of location aware smart event handling. The use cases are not limiting as location aware smart event handling may be utilized in a multitude of other scenarios. In an example, the user 130 may arrive home via the automobile 22. At a first location 131*a*, the user 130 exits the automobile 22 and the automobile provides a message to the central controller 60 to indicate that the user 130 has exited the automobile 22 (e.g., a change in status message). The central controller 60 may save the status change information with the current time. The automobile 22 may also provide information regarding the time the user 130 entered the vehicle, as well as other information such as odometer data, maintenance requirements, current gas level, and similar information associated with owning and maintaining an automobile. As the user enters the kitchen 102 to greet the spouse 132 at a second location 131*b*, the oven 41 may be configured to detect the presence of the user 130 based on presence detectors within the oven 41, or other presence detectors in the kitchen 102 in communication with the oven 41. The central controller 60 may receive an indication from the oven 41, or other presence sensor, that the user 130 is currently in the kitchen 102 and then store the user's location information with the current time. If the user 130 receives a notification (e.g., an email message) while in the kitchen 102, the central controller 60 may send a notification message to the oven 41 or the networked speaker device 112 to alert the user of the arrival of the new message. The alert may be, for example, a sound, a visual display, or an audio representation of the email content (e.g., via the networked speaker device 112). The spouse 132 may be preparing a meal for the family and may have set a timer on the oven 41. The oven 41 may also be configured to send a notification to one or more individuals in the home 100 when the timer reaches zero (e.g., a dinner bell).

The user 130 may linger in the kitchen 102 and may place their mobile device 16 on a charging station 111 (e.g., for recharging the mobile device via wired or wireless/inductive technologies). The central controller 60 is configured to receive an indication from the mobile device 16 or the charging station 111 indicating that mobile device 16 is currently located on the charging station 111 in the kitchen 102 and it is currently in a charging state. The user 130 may then enter the family room 104 at position 131*d* to spend time with the elder child 134 and watch the television 114. Presence detectors in the family room 104 and/or the television 114 may provide an indication to the central controller 60 that the user 130 is in the family room 104, and the central controller 60 is configured to store the new location of the user 130 with the current time. For example, the television 114 may include a camera and a microphone and may be configured to perform image and voice recognition (i.e., local recognition). In an example, the television 114 may be a means for obtaining an image or sound data, and provide visual and acoustic information to the central controller 60 for recognition processing (e.g., remote image processing). The central controller 60 previously recorded that the elder child 134 was in the family room 104 and is providing notifications for the elder child 134 to the television 114. The user 130 may create and store notification preferences on the central controller 60 to indicate that notifications for the user 130 should not be forwarded to the television 114. In an example, the notification preferences established by the user 130 may indicate that notifications should be forwarded to the television 114 only when the user 130 is the only individual in the family room 104. The user 130 may conclude his time in the family room 104 and head to visit the younger children 136*a-b* in the bedroom 106. The presence sensors in the family room 104 and/or the television 114 may detect the departure of the user 130 and the central controller 60 may be configured to log the departure time. In an example, the departure of the user 130 from the family room 104 may cause the central controller 60 to activate other presence sensors to determine a current location of the user 130.

The user 130 may continue to the bedroom 106 to position 131*e* to talk with the younger children 136*a-b*. The bedroom 106 includes the gaming console 118 and the monitor 120 which are configured to communicate with the central controller 60. The gaming console 118, the monitor 120, or other presence sensors in the bedroom 106 may detect the arrival of the user 130 and the central controller 60 is configured to record the time and new location of the user 130. For example, a microphone and/or camera in the gaming console 118 may detect the user 130. While the user 130 is in the bedroom 106, the automobile 22 may send an alert to the central controller 60 to indicate that one of the tires on the automobile 22 is losing air (e.g., a low tire pressure alarm). The user 130 may establish notification preferences such that all notifications from the automobile 22 are to be forwarded to any capable device. Accordingly, the central controller 60 determines that the user 130 is currently in the bedroom 106 and that the gaming console 118 is capable of displaying the notification. The low tire pressure alarm notification may be displayed on the monitor 120 and the user may provide an acknowledgement (e.g., verbal, gesture, or via an input device) upon receipt of the notification. The central controller 60 may be configured to broadcast some notifications to multiple devices regardless of a user's location. For example, emergency messages such as the detection of fire, smoke, sump pump failure, or other personal emergencies may be simultaneously forwarded to multiple devices in the home 100.

The low tire pressure notification message may prompt the user 130 to leave the bedroom 106 and enter the office 108 to research local tire repair shops on the laptop 12. Presence sensors in the office, or the laptop 12, may provide an indication to the central controller 60 that the user 130 is currently located in the office 108. The central controller 60 may log when the user 130 departs from the bedroom 106 and when the user 130 enters the office 108. While the user 130 is using the laptop 12, the dinner alarm on the oven 41 may reach zero and the oven 41 may send a notification to the central controller 60. The central controller 60 may forward the dinner alarm notification to the television 114 (e.g., to alert the elder child 134), the gaming console 118 (e.g., to alert the younger children 136*a-b*), and the laptop 12 (e.g., to alert the user 130). In an example, the oven 41 may be configured to query the central controller 60 for the current locations of the elder child 134, the younger children 136*a-b*, and the user 130 and send the notifications directly to the television 114, the gaming console 118, and the laptop 12.

Figure 5:
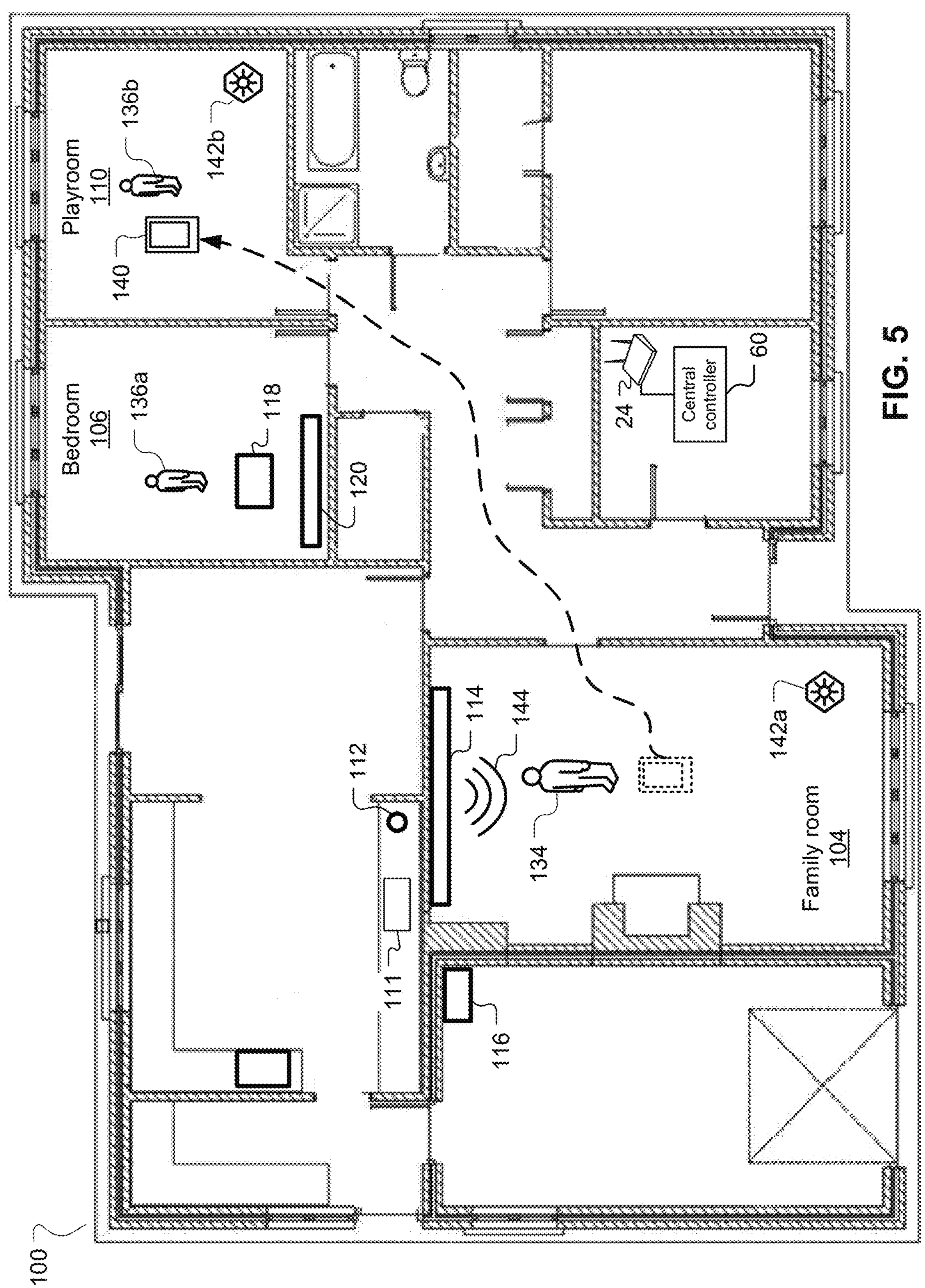
FIG. 5 is an example use case of a mobile device with multiple users in the household communication system.

Referring to FIG. 5, with further reference to FIG. 4, an example use case of a mobile device with multiple users in the household communication system is shown. In the example use case depicted in FIG. 5, the elder child 134 is in the home 100 with the younger children 136*a-b*. In this example, the adults (e.g., the user 130 and the spouse 132 not shown in FIG. 5) have left in the automobile 22 and are in regular communication with the elder child 134 via notifications through a mobile device 140. The mobile device 140 was originally in the family room 104 with the elder child 134 and thus the central controller 60 would forward notifications to mobile device 140. A younger child 136*b* subsequently obtained the mobile device 140 and moved with it to a playroom 110 to watch a movie on the mobile device 140. The central controller 60 is configured to detect the movement of the mobile device and determine a current user of the mobile device 140. For example, the movement of the mobile device may be determined based on changes in the received signal strength between the mobile device 140 and the access point 24, the television 114, and/or the gaming console 118. A location of the mobile device 140 may be determined based on ranges to the other devices in the home 100 (e.g., RTT, RSSI, OTDOA). In an embodiment, a Visual Light Communication (VLC) system may be used to determine the current location of a device. For example, the mobile device 140 may be configured to determine a change in location based on signals received from a first VLC light source 142*a* in the family room 104 and a second VLC light source 142*b* in the playroom 110. The current user of the mobile device 140 may be determined based on the locations of the mobile device 140 and potential users (e.g., the younger child 136*b*). For example, presence sensors in the playroom 110 may detect the presence of the younger child 136*b* and the position of the mobile device 140 may also be determined to be in the playroom 110. In an example, a user log-in credential may be used to determine a current user. The current state of the mobile device 140 such as the current executing application (e.g., a game, a social media application, a streaming media application) may be used to infer a current user. A sensor on the mobile device 140 such as a camera (e.g., image recognition) and a microphone (e.g., voice recognition) may be used to determine the current user.

The central controller 60 may be configured to determine the locations of both the devices and the persons in the home 100. The central controller 60 maintains a chronological log of the respective locations and can determine when a device and a user are no longer collocated. In this example, the central controller 60 determines that the mobile device 140 has moved to the playroom 110 and that the elder child 134 has not moved from the family room 104. As a result, the central controller 60 is configured to provide future notifications for the elder child 134 to the television 114. When the adults (e.g., the user 130 and the spouse 132) contact the elder child 134, a notification 144 may be displayed, sounded, or otherwise presented on the television 114 rather than the mobile device 140. Correspondingly, if the adults desire to contact the younger children 136*a-b*, the central controller 60 may send notifications to the gaming console 118 and the mobile device 140, respectively.

Figure 6:
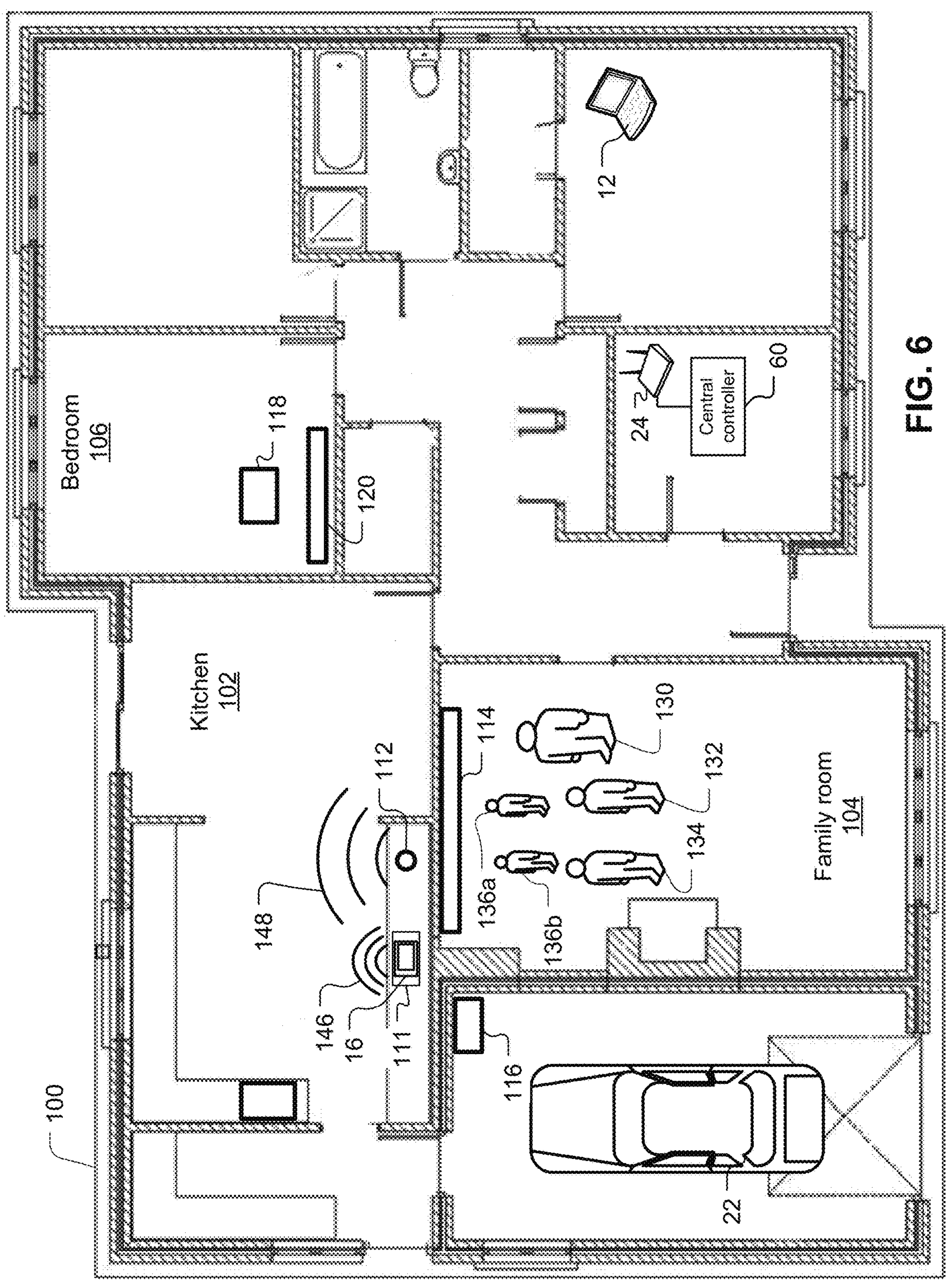
FIG. 6 is an example use case of a static device with multiple users in the household communication system.

Referring to FIG. 6, with further reference to FIGS. 4 and 5, an example use case of a static device with multiple users in a household communication system is shown. In the use case depicted in FIG. 6, the user 130, the spouse 132, the elder child 134 and the younger children 136*a-b* are located in the family room 104 with the television 114. Sensors on the television 114 (e.g., camera, microphone) and other presence sensors in the home 100 may be used to establish the locations of each of the individuals. The central controller 60 is configured to maintain a chronological log of the locations of each of the individuals. In an example, the user 130 may receive a notification (e.g., based on an email/message from external server (not shown in FIG. 6), an alarm from the vehicle 22, a reminder from the laptop 12, etc.) and the central controller 60 may direct the notification to one or more devices based on preferences established by the user 130. For example, the user 130 may establish a priority for each device to indicate a relative order in which the notifications are to be forward. The central controller 60 may initially forward the notification to the mobile device 16 currently in the charging station 111. The notification message from the central controller 60 may include parameters associated with how the notification is to be presented (e.g., display, audio). As previously described, the central controller 60 may utilize the current location for the user 130 and the mobile device 16 to determine that there is some space between the user 130 and the mobile device 16 (e.g., they are in neighboring rooms). The notification may include attributes to control the volume of a speaker on the mobile device 16, and the mobile device 16 may the produce a first notification message 146 at a higher volume (e.g., so that the user 130 in family room 104 may hear it). If the user 130 does not acknowledge the notification message 146 within a certain time (e.g., 20 sec, 40 sec, 1 minute), the central controller 60 may send the notification to the networked speaker device 112. The networked speaker device 112 may produce an audio signal 148 at a volume level corresponding to the distance to the user 130 based on attribute information included in the received notification message (e.g., the greater the distance, the louder the audio signal). In an example, a volume level preference may be included in the notification message. The networked speaker device 112 may be configured to receive an acknowledgement from the user 130 (e.g., via a voice command). If the user 130 does not acknowledge the audio signal 148 within a pre-established time limit, the central controller 60 may be configured to send a notification message to the television 114. Continuing the example from FIG. 4, the preferences stored on the central controller 60 for the user 130 may indicate that notifications for the user 130 may not be presented on the television 114 if other individuals are in the family room 104. In this example, the central controller 60 may attempt to send notifications from the top of the priority order (e.g., make additional attempts for each device), or it may send a pending-notification signal a device to indicate that an unacknowledged notification is stored on the central controller 60. The pending-notification message is a particular subset of a notification message in that the pending-notification message does not include the text associated with the notification. Rather, the pending-notification message contains an information element (e.g., a bit, a character) to enable the user specific icon to be displayed on one or more notification devices associated with the location of the user. In an example, the pending-notification signal may be sent to the television 114, or other devices, and a small icon associated with the user 130 may be displayed on the television 114, or other devices, to prompt the user 130 to retrieve the pending-notification.

Figure 7A:
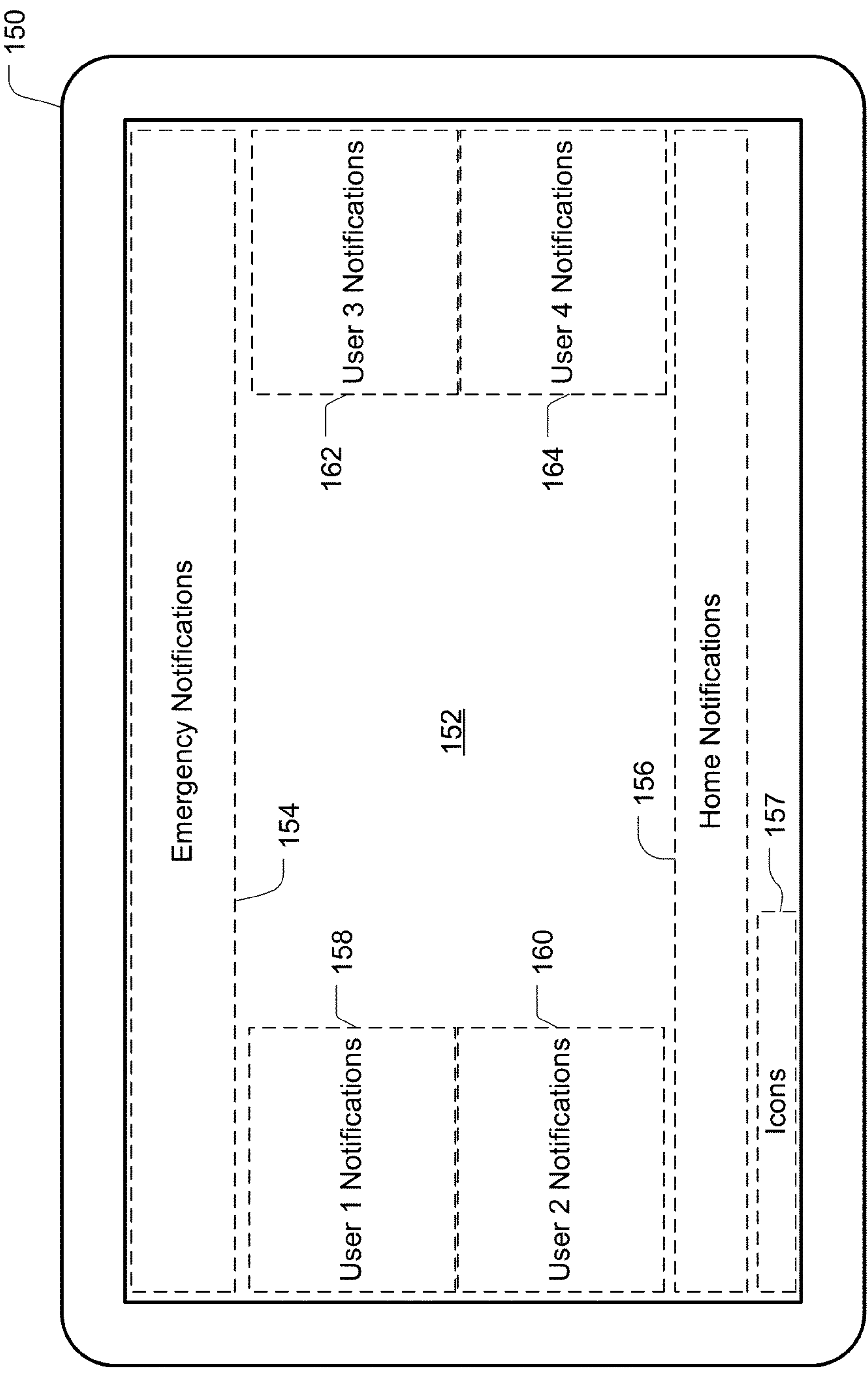
FIGS. 7A and 7B are examples of a device with a multiuser notification display.
Figure 7B:
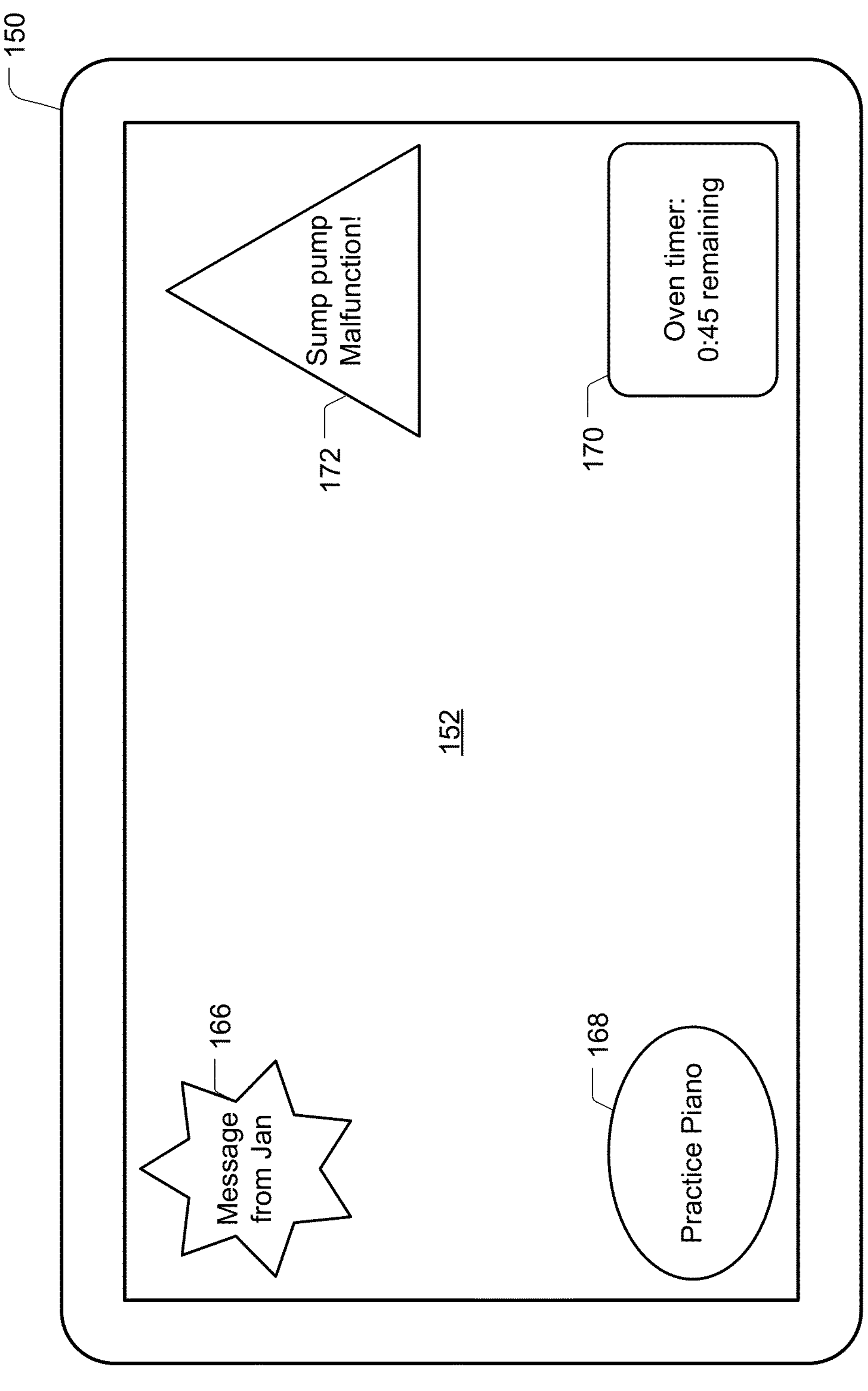

Referring to FIGS. 7A and 7B, with further reference to FIG. 6, an example device 150 with a multiuser notification display is shown. The devices 150 may be a display device that is generally viewed by multiple users simultaneously. For example, the device 150 may be the television 114, the gaming console 118 with the monitor 120, or the mobile device 140. The device 150 may receive notification messages with attribute information from the central controller 60 to provide personalized notifications based on user preferences. In an example, referring to FIG. 7A, the device 150 includes a display area 152 with one or more notification areas such as an emergency notification area 154, a home notification area 156, an icon display area 157, a first user notification area 158, a second user notification area 160, a third user notification area 162, and a fourth user notification area 164. The number and disposition of the notification areas are exemplary only and not a limitation as additional or fewer areas may be configured on the display area 152. The attributes in the notification messages received from the central controller 60, or other devices on the network, may include information associated with the intended notification recipient and/or the origin of the notification (e.g., sending user, sending device). The emergency notification area 154 may be a banner area across the display area 152 and may be utilized to display notifications with an emergency attribute. For example, in a health care use case, a home based medical device (e.g., meters/monitors, respiratory equipment, telehealth equipment) may be configured to communicate with the central controller 60 to provide notifications to one or more users. Emergency notifications from such devices may be received by the device 150 and a corresponding notification may be displayed in the emergency notification area 154. Other emergency notifications such as weather alerts, personal distress alarms (e.g., medical alert devices, fall detection), and fire/security notifications may include an emergency attribute and be displayed in the emergency notification area 154.

The home notification area 156 is used to display notifications with a home notification attribute. For example, home related devices such as ovens, refrigerators, climate control systems, sump pumps, solar cell chargers, and the like may be configured to communicate with the central controller 60. Status messages received from these devices may be forwarded to the device 150 and displayed in the home notification area 156. As depicted in FIG. 7A, the home notification area 156 may be a banner at the bottom of the display area 152. This relative location provides an immediate visual indicator to the user that the notification relates to a home system.

The icon display area 157 may be an area on the periphery of the display area 152 to present one or more small icons associated with the users of the device 150 to prompt one or more of the users to retrieve pending-notifications. In an example, each user may have an icon preference (e.g., a particular icon design, a personal avatar) which may be displayed in the icon display area 157 whenever the corresponding user is collocated with the device 150. In an example, a user icon may be displayed regardless of the locations of the user and the device. Referring to FIG. 4, the central controller 60 may provide a pending-notification message to various devices in the home 100 based on the current location of the user 130. For example, if the user 130 has one or more pending-notifications, the networked speaker device 112 may emit a user specific ring tone or a speech notification when the user 130 is located in the kitchen 102 to indicate that the user 130 has a pending notification. The central controller 60 may provide one or more notification messages based on the current location of the user 130. The notification message may instruct a device to display an icon associated with the user 130 in the icon display area 157 when the user is detected in a location (e.g., on the television 114 when the user is in the family room 104, on the monitor 120 when the user enters the bedroom 106, or on laptop 12 when the user enters the office 108). In an example, the central controller 60 may send notifications to multiple devices in the home 100 to activate a user specific icon display regardless of the location of the user 130.

The display area 152 may include one or more notification areas to display notifications associated with individual users or user groups. For example, notifications for the user 130 may be displayed in the first user notification area 158, notifications for the spouse 132 may be displayed in the second user notification area 160, notifications for the elder child 134 may be displayed in the third user notification area 162, and notifications for the younger children 136*a-b* may be displayed in the fourth user notification area 164. The number, locations and dimensions of the user notification areas may vary based on the size and capabilities of the device 150. The central controller 60 may provide attribute and preference information in a notification message to enable the device 150 to present a notification in an appropriate area of the display area 152. In an example, referring to FIG. 7B, the device 150 may be configured to use one or more different balloon features to display system or user specific notifications. In general, balloon features may be any different geometric patterns or visual combinations which allow for visual distinctions between different balloon features. Examples of different geometric patterns may include a star shape 166, an oval shape 168, a triangle shape 172, and rectangle shape 170. Other patterns, colors, textures, fonts, icons, and audible sounds (e.g., for non-display device) may be used. A balloon feature may be associated with a specific user, or user group, and serve as an immediate visual or audible indicator that a notification is intended for a specific user. For example, notifications for the spouse 132 may be presented in a star shaped balloon 166, notifications for the elder child 134 may be presented in an oval shape 168, emergency notifications may be presented in a triangle shape 172 and home notifications may be presented in a rectangle shape 170. The shapes and relative locations of the balloon features on the display area 152 are exemplary only as other user specific shapes may be used. In an example, a combination of balloon features and notification areas may be used to provide user specific notifications on a multiuser device.

Figure 8:
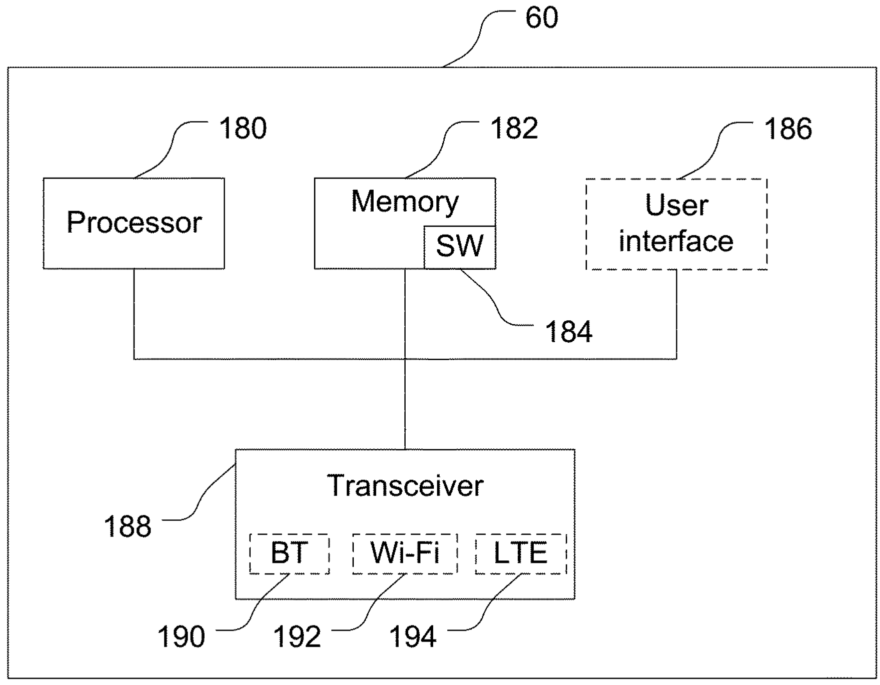
FIG. 8 is a block diagram of components of a central controller shown in FIGS. 2-6.

Referring to FIG. 8, with further reference to FIGS. 1-6, an example of the central controller 60 comprises a computer system including a processor 180, a memory 182 including software (SW) 184, an optional user interface 186, and a transceiver 188 optionally including a BLUETOOTH (BT) radio 190, a Wi-Fi radio 192, and/or an LTE radio 194. Other types of radios may also or alternatively be used, e.g., a BLUETOOTH-Low Energy (BT-LE) radio. The processor 180 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 180 may comprise multiple separate physical entities that can be distributed in the central controller 60. The memory 182 may include random access memory (RAM) and/or read-only memory (ROM). The memory 182 is a non-transitory, processor-readable storage medium that stores the software 184 which is processor-readable, processor-executable software code containing instructions that are configured to, when performed, cause the processor 180 to perform various functions described herein. The description may refer only to the processor 180 or the central controller 60 performing the functions, but this includes other implementations such as where the processor 180 executes software and/or firmware. The software 184 may not be directly executable by the processor 180 and instead may be configured to, for example when compiled and executed, cause the processor 180 to perform the functions. Whether needing compiling or not, the software 184 contains the instructions to cause the processor 180 to perform the functions. The processor 180 is communicatively coupled to the memory 182. The processor 180 in combination with the memory 182, the user interface 86 (as appropriate), and/or the transceiver 188 provide means for performing functions as described herein, for example, means or receiving a notification message for a user, means for determining a location of the user, means for determining a notification device, means for determining one or more notification preferences associated with the user and one or more notification devices, and means for sending an alert message based on the notification preferences. The software 184 can be loaded onto the memory 182 by being downloaded via a network connection, uploaded from a disk, etc. The central controller 60 is shown in FIGS. 2, 4-6 as a standalone device separate from the devices 40-47, 112, 114, 118, 120, 140 but the central controller 60 could be implemented by one or more of the devices 40-47, 112, 114, 118, 120, 140 and/or one or more other wireless communication devices such as the Wi-Fi router 24. The central controller 60 is preferably, though not necessarily, a (primarily) static device.

The central controller 60 may act as a repository for, and tracker of, information regarding the devices 40-47, 112, 114, 118, 120, 140 and the users 130, 132, 134, 136*a-b*. For example, the central controller 60 may store config files and/or attributes of one or more of the devices 40-47, 112, 114, 118, 120, 140 as well as preference information for the users 130, 132, 134, 136*a-b*. The central controller 60 may use this information to produce alert messages/notifications. As another example, the central controller 60 may track locations of one or more of the devices 40-47, 112, 114, 118, 120, 140 and/or the locations of one or more of the users 130, 132, 134, 136*a-b*.

The processor 180 is configured to generate, store (via the memory 182), modify, and transmit (via the transceiver 188) attribute values and preferences corresponding to the devices 40-47, 112, 114, 118, 120 and the users 130, 132, 134, 136*a-b*. The processor 180 may determine and update the attributes, e.g., each time the processor 180 detects a possible change in an attribute (e.g., new location of a user, new location of a device, a new device within communication range, etc.). The device and user attributes and preferences may be stored by other devices and their respective values will typically vary depending on that device. In an example, the capabilities of the central controller 60 may be performed by one or more of the devices 40-47, 112, 114, 118, 120, 140 (e.g., a device 70 in FIG. 3), and the processor 180 may store attribute values of other devices 40-47, 112, 114, 118, 120, 140. For example, referring also to FIGS. 10A and 10B, the processor 180 may generate and maintain attribute tables 220, 240 including indications of attributes 222, 242 and respective values 224, 244. The attribute table 220 includes an index 226, a start time 228, an end time 230, a user identification 232, a user location 234 and a device identification 236. The index 226 may uniquely identify a record in the table 220. The start time 228 and the end time 230 contain time stamps corresponding to the time that a user in in a location. The user identification 232 identifies a particular user or user group. In an embodiment, the user identification 232 is pointer to a user table (e.g., based on an index value). The user location 234 identifies the current location of the use in an appropriate coordinate system (e.g., ENU, LLA, common name). The device identification 236 may include information associated with a device that is reporting the user location. In an example, the device identification 236 is a link (e.g., index value) to a device table. Other attribute fields may associated with a user location may be included in the table 220.

The table 240 includes attributes associated with the location of a mobile device. For example, the table 240 includes an index 246, a device identification 248, a start time 250, and end time 252, a device location 254, a current user identification 258 and a state 260. The index 246 may uniquely identify a record in the table 240. The device identification 248 may include information to identify a particular device. For example, the device identification may be an index value corresponding to a device table. The start time 250 and the end time 252 correspond to the time a device is in a location. The device location 254 is an indication of the location of the device in an appropriate coordinate system (e.g., ENU, LLA, common name). The current user 258 indicates a user or user group that is currently using the device. The current user 258 may contain an index associated with a user table. The state 260 is an indication of the current state of the device. The state may include information on current applications executing on the device, an indication of whether the device is a hibernate state, current power level, or other operational parameters to identify the current state of the device. The attributes 222, 242 and the values 224, 244 are examples only as other attributes and values may be included.

The processor 180 may maintain tables of attributes for devices and users presently and/or formerly associated with the home 100. In an example, a user may provide preferences for one or more attributes associated with a device. Referring to FIG. 10C, a table 270 includes indications of user preferences 272 and values 274. The table 270 includes an index 276, a user identification 278, a device identification 280, a priority preference value 282, a privacy preference 284, a display area preference 286, an alert style preference 288 and a wake-up preference 290. The index 276 uniquely identifies a record in the table 270. The user identification 278 and the device identification 280 identify a relationship between a user (or user group) and a device. The priority preference value 282 may contain an integer value to indicate a relative preference order in which the device will provide notifications to the related user. A priority preference value 282 of zero may indicate that notifications are not to be forward to a device. The privacy preference 284 may include a Boolean value (e.g., true/false) to indicate that private notifications may be sent to the device. In an example, the privacy preference 284 may include a link (e.g., index value) to a privacy rules table containing rules/constraints to determine if and how notifications are presented on a given device for a specific user. The display area preference 286 may indicate an area in a device display that the user's notifications should appear. The display area preference value 286 may be text string or a link to a display related options table to indicate the user preferred notification area. The alert style preference 288 includes data pertaining to how an alert may be presented. In an example, the alert style preference 288 may indicate visual aspects (e.g., balloon features), audio aspects (e.g., tones, volume, text to speech), or other aspects to enable each user to configure how notifications are presented on a specific device. The wake-up preference 290 includes data (e.g., a Boolean value) to indicate whether a device should change state from "hibernate" to "awake" upon receipt of a notification. In general, the user preferences in table 270 enable a device to selectively perform attributes based on a particular user. A device 70 including the processor 80 may also be configured to generate and store attribute and preference values associated with other devices and users. In an example a device 70 may be configured to just relay the attribute and preference values to other devices in a network.

The user preferences 272 and the corresponding values 274 are examples only as other user preferences and values may be included based on the capabilities of the devices in a network as well as other system considerations.

The processor 180 is configured to determine and provide positions of the devices and users relative to one or more reference locations or objects, and may provide the positions in one or more formats. For example, the processor 180 may generate a position relative to a fixed location in space. A user location 234 and a device location 254 may include a value in ENU (East, North, up) coordinates based on common reference point (e.g., origin). In an example, the locations may be provided in a Latitude, Longitude and Altitude (LLA) format. The processor 180 may be configured to monitor the positions of the devices and users in the home 1000. The processor 180 may be configured to determine a change in the position of a device based on a neighboring device list, ranges to neighbors, and/or an estimated position. The processor 180 may be configured to determine the location of a user based on sensor input (e.g., image recognition, sound recognition, presence sensors) or user activity (e.g., activating a device, entering log-in credentials). In an example, the processor 180 may infer a user based on the state 260 of a device. For example, the state 260 may indicate one or more applications that are executing on a device. Historical data may be used to correlate a state 260 with a current user 258. The processor 180 may be configured to provide peer monitoring to detect changes in the location of one or more neighbor devices. For example, the processor 180 may detect and report a change in position of a particular neighboring device if the positions of a majority of the neighboring devices are constant while the relative position of the particular neighboring device changes. The processor 180 may report a change in position of a particular device if the existence of the particular neighboring device on the neighbor list changes, e.g., from being on the list to not being on the list, or from not being on the list to being on the list, while the ranges to other devices on the neighbor list remain the same.

The central controller 60 may store and maintain a device and user attributes and preferences in chronological order (e.g., based on start times 228, 250). The chronological information stored in the tables 220, 240 may be used, as discussed in the preceding use cases, to facilitate locating a user and/or a device and providing user specific notifications. The central controller 60 is configured to produce and maintain (e.g., update) the device and user attribute and preference information including the tables 220, 240, 270. In other examples, the central controller 60 may be configured to produce and maintain a device and user data with a different set of fields (e.g., more fields, fewer fields, different fields, or a combination thereof). The central controller 60 is, and in particular the transceiver 188 and the processor 180 are, configured to receive information for populating the tables 220, 240, 270 from the devices 40-47, 112, 114, 118, 120, 140. The information for the tables 220, 240, 270 may be received directly from the device to which the information pertains, and/or from one or more devices that relay the information. Consequently, the central controller 60 may receive information for one or more of the devices 40-47, 112, 114, 118, 120, 140 via one or more of the radios 190, 192, 194 even though the device from which the information was originally sent does not include the type of radio in the transceiver 188 through which the controller 60 receives the information. The devices 40-47, 112, 114, 118, 120, 140 may send information for the tables 220, 240, 270 periodically, or in response to a change in the information for one or more of the fields in the tables 220, 240, 270. Further, the central controller 60 (or the device 70) may create an attribute entry for another device. For example, a discovering device (e.g., the controller 60 or the device 70) may see another device that is not part of an attribute table and may generate an attribute table entry (or entries) for that device, and may transmit that attribute table entry (or entries) to one or more other devices, and/or may transmit information to one or more other devices which may generate an attribute table entry (or entries) using this information. Thus, the device 70 may discover a "new" device, generate one or more attribute table entries for the new device, and send the attribute table entry (or entries), directly or indirectly, to the controller 60 for storage. Also or alternatively, the device 70 may discover a "new" device, send (directly or indirectly) information regarding the new device to the controller 60 for generation and storage of an attribute table entry (or entries).

Figure 9:
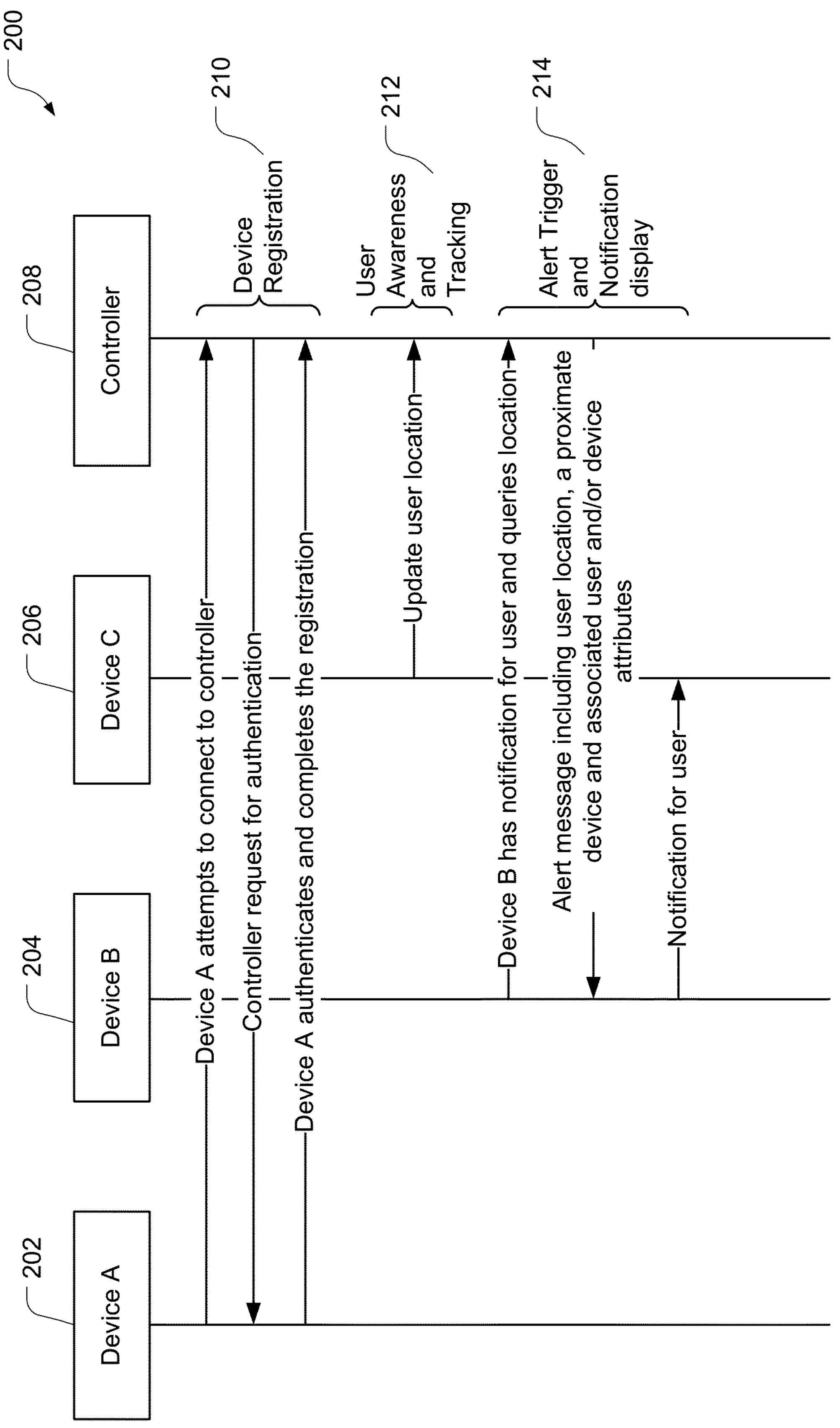
FIG. 9 is an example message flow for user location tracking.

Referring to FIG. 9, an example message flow 200 for user location tracking is shown. The message flow 200 is an example of communication between networked devices and includes a controller 208 and three example devices labeled as device A 202, device B 204 and device C 206. The message flow 200 is divided into three events including a device registration event 210, a user awareness and tracking event 212, and an alert trigger and notification display event 214. The controller 208 may be the central controller 60 or a device 70. The three example devices 202, 204, 206 may include the devices 40-47, 112, 114, 118, 120, 140. During the device registration event 210, device A 202 attempts to connect to the controller 208 and complete a registration process. For example, the controller 208 may be part of an 802.11 network and may request authentication information from device A 202. The authentication may include a security exchange such as Wired Equivalent Privacy (WEP) and Wi-Fi Protected Access (WPA), or other security protocols. Device A 202 may complete the authentication process and registration process by providing device and user attribute data to the controller 208. For example, device A 202 may provide data stored in memory including fields such as the attribute and preference tables 220, 240, 270 to the controller 208. Device A 202 may be configured to provide updates to the registration information based on a periodic basis, or when triggering events occur (e.g., if device A leaves the network, relocates to a new location in the network, receives new/updated user data). The controller 208 is configured to maintain the registration information, including device and user attribute data, for each of the devices in the network.

In the user awareness and tracking event 212, the devices 202, 204, 206 are configured to provide information regarding the location of users to the controller 208. For example, device C 206 may include sensor information such as facial or voice recognition to determine the location of a user. Other presence sensors may be operably coupled to device C 208 to provide an indication of the location of a user. In an example, a user input (e.g., log-in process) may be used to determine the location of a user. Device C 206 may be configured to log user identification information 232, user location information 234, and a start time 228 in an attribute table 220. The attribute table, or the corresponding data fields, may be provided to the controller 208 via a wireless data exchange. The controller 208 is configured to store the attribute information in one or more tables and provide the information to other devices on the network.

In the alert trigger and notification display event 214, a device in the network may send a notification to another device directly or via the controller 208. For example, device B 204 may have a notification for a user and may send a query to the controller 208 to request the user's location. The query sent by device B 204 may include a user identification and the controller 208 is configured to determine a location, a proximate device and any associated user and device attributes included in the device and attribute tables 220, 240, 270. The controller 208 generates an alert message including attributes and preferences associated with the location of the user. In an example, the alert message may include one or more 802.11 Media Access Control (MAC) frames to transport the attribute and preference information. In an example, the alert message may include the location of the user based on ENU or LLA coordinates. The location information may also be based on a common names in an area (e.g., kitchen, family room, bedroom, office, etc.). The controller 208 sends the alert message to device B 204, which may then send a notification to one or more devices based on the attribute information in the alert message. For example, device B 204 may send a notification for a user directly to device C 206. In an example, device B may send the notification to the controller 208 and the controller 208 may forward the notification to device C in an alert message (i.e., based on the attribute and preference information). In an embodiment, the notification sent to device C 206 may require an acknowledgement from the user (e.g., a confirmation of receipt) via an input apparatus on device C 206. For example, device C 206 may have a touch screen display or microphone or other sensor configured to receive a user input. Device C 206 may send an acknowledgement message to device B 204 or the controller 208.

Figure 11:
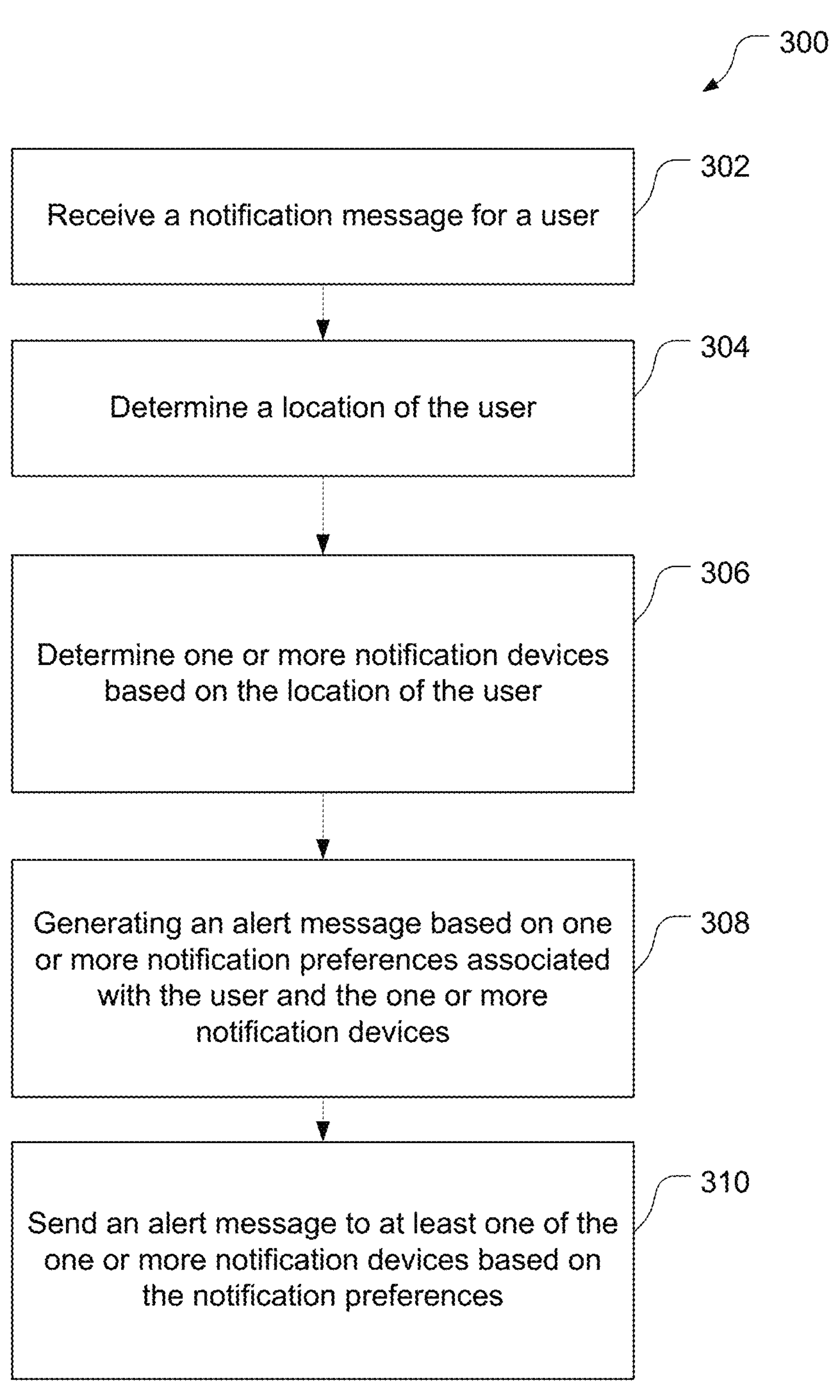
FIG. 11 is a block flow diagram of a method of sending an alert message.

Referring to FIG. 11, with further reference to FIGS. 1-10C, a method 300 for sending an alert message includes the stages shown. The method 300 is, however, an example only and not limiting. The method 300 can be altered, e.g., by having stages added, removed, rearranged, combined, performed concurrently, and/or having single stages split into multiple stages.

At stage 302, the central controller 60, or other communication device such as a device 70, may receive a notification message for a user. The notification message may originate from an external server 30 via the network 28 (e.g., a messaging server, email server, voice or video communications server) or from another device within a network (e.g., devices 40-47, 112, 114, 118, 120, 140). The notification includes an indication of a user or group of users such as email address, phone number, user identification number, user name, or other data field, and the central controller 60 (or other communication device) is configured to query one or more data structures to determine attributes and preferences associated with the user. In an example, the notification message may include information to be forwarded to a user. The notification message may be a query from a device to obtain attributes and preferences associated with the user without including the information to be forwarded to the user.

At stage 304, the central controller 60 or other communication device determines the location of the user. The location of the user may be based on at least one presence sensor. In an example, the central controller 60 may query a data structure such as the attribute table 220 based on the user identification 232 to determine a user location 234 based on prior sensor information. The attribute table 220 may include user location information in chronological order (e.g., based on the start time 228 or the end time 230) and the central controller 60 may select the most recent entry as the current location of the user. In an example, the location information may become stale (e.g., the difference between the current time and the most current start time 228 exceeds a threshold value) and the central controller 60 may attempt to execute a user search function on the network. A user search function may include communications from the central controller 60 to one or more devices 40-47, 112, 114, 118, 120, 140 with instructions to activate a presence sensor associated with the device. For example, the gaming console 118 or television 114 may include a camera and the user search function may instruct the device to obtain an image with the camera. A device may perform local image processing, or send the image to the central controller 60 for image recognition process to determine if the user is in the image. In an example, the user search function may include using the central controller 60 to contact a remote server to obtain user location information (e.g., Google Geolocation, Life360, etc.). In another example, the user location may be inferred based on historical data on the central controller 60 (e.g., attribute tables 220, 240).

At stage 306, the central controller 60 or other communication device determines one or more notification devices based on the location of the user. A location attribute of the user determined at stage 304 may be used to select one or more devices based on the current device locations. For example, the central controller 60 may query the attribute table 240 based on the user location 234 as compared to the device location 254. The query parameters may include a range function such that devices within a range threshold (e.g., 1 m, 3 m, 10 m) of the user location may be selected. In an example, the user and device locations may correspond to room identification values (e.g., family room 104, bedroom 106, etc.), and the query may select devices based on the room identification value. In another example, one or more devices may be determined regardless of the value of the user location 234 (e.g., one more devices may be determined based on other user preference values).

At stage 308, the central controller 60 or other communication device generates an alert message based on one or more notification preferences associated with the user and one or more notification devices. The central controller 60 may query a preference table 270 based on the user identification 278 and one or more device identification values 280 to determine one or more preference values (e.g., priority preference value 282, privacy preference 284, display area preference 286, display style preference 288, wake-up preference 290, and others). The central controller 60 may generate one or more alert messages based on the preference values. In an example, the central controller utilizes data frames in existing wireless messaging protocols (e.g., 802.11, BT-LE) to generate alert messages based on one or more preference values. The data frames may be populated with the appropriate preference values. The alert message may also contain one or more attributes from the attribute tables 220, 240. Referring to the use cases described in FIGS. 4-6, a device may provide a notification based on a received alert message. For example, the television 114 may display a user notification in a user notification area based on the value of display area preference 286 in the alert message. The networked speaker device 112 may present an audio notification based on a user preference value, such that the volume of the audio notification is based on a distance between the user and the device (e.g., user location 234 and device location 254). If multiple devices identifications 280 are selected, the central controller 60 may generate multiple alert messages based on the priority preference values 282, or other rules and constraints available to the central controller 60.

At stage 310, the central controller 60 or other communication device sends an alert message to at least one of the one or more notification devices based on the notification preferences. The central controller 60 may utilize network transport protocols associated with the devices on the system 10 to provide an alert message containing the attribute and preference values to the appropriate devices. The central controller 60 may send the alert message based on the location of the user (e.g., to the closest device), in an order based on a preference value (e.g., priority), based on the capabilities of the device (e.g., display/audio), or combinations thereof. The central controller 60 may determine not to send an alert message based on preference values (e.g., the privacy preference value 284). The alert message may be a pending-notification message configured to activate a user specific icon on a device. In an example, the central controller 60 may send the alert message to a requesting device (e.g., device B 204 in FIG. 9), and the requesting device may generate and send a notification message to another device based on the attributes and preferences included in the alert message received from the central controller 60. In an example, the attribute and preference tables 220, 240, 270 may exist on one or more other communication devices in a network and thus the number of operations performed by the central controller 60 may be reduced or eliminated.

Referring to FIG. 12, with further reference to FIGS. 1-10C, a method 320 sending an alert message to a notification device includes the stages shown. The method 320 is, however, an example only and not limiting. The method 320 can be altered, e.g., by having stages added, removed, rearranged, combined, performed concurrently, and/or having single stages split into multiple stages.

At stage 322, the central controller 60 receives a notification for a user. The notification message may originate from an external server 30 via the network 28 (e.g., a messaging server, email server, voice or video communications server, a medical alert system) or from another device within a network (e.g., devices 40-47, 112, 114, 118, 120, 140). The notification includes an indication of a user or group of users such and email address, phone number, user identification number, user name, or other data field. The notification message may include one or more fields indicating that the notification is of an emergency status. For example, the notification may originate from a medical alert system associated with elderly relative a user and an emergency status may be inferred based on the originator's address (e.g., the medical alert system). In another example, a control system in home (e.g., sump-pump, fire detector, CO2 monitor) may be configured to send a notification to a user with an emergency field. At stage 324, the central controller 60 is configured to determine if the notification message is an emergency. The decision may be based on the origin of the notification message, an implicit emergency field in the notification message, or on other criteria associated with information in the notification message.

At stage 326, the central controller 60 determines one or more emergency devices associated with the user. In an example, the central controller 60 may query the preference table 270 with the user identification 278 and priority preference value 282 to determine one or more device. In one implementation, the priority preference value 282 may include one or more characters (e.g., the letter 'E,' or other characters) or other information to signify the user's desire that the device be used for emergency notifications. In another example, the central controller 60 may determine that all devices associated with the user identification 278 will receive an emergency alert message.

At stage 328, the central controller 60 sends an alert message to the one or more emergency devices. The central controller 60 may utilize network transport protocols associated with the devices on the system 10 to provide an alert message to the emergency devices. The central controller 60 may send the alert message to multiple devices, and multiple times (e.g., repeatedly) until an acknowledgment is received from the user. The central controller 60 may also send pending-notification messages to one or more devices that are associated with the user but are not necessarily identified as an emergency device.

At stage 329, the central controller 60 determines the location of the user. In an example, the central controller 60 may query a data structure such as the attribute table 220 based on the user identification 232 to determine a user location attribute 234. The attribute table 220 may include user location attributes in chronological order (e.g., based on the start time 228 or the end time 230) and the central controller 60 may select the most recent entry as the current location of the user. In an embodiment, the user location may be inferred based on historical data on the central controller 60 (e.g., attribute tables 220, 240). For example, the central controller 60 may query the attribute table 220 based on the current time (e.g., as compared to the start time 228) and the user identification 232, and the query results may return one or more device identification values 236, which may be linked to device locations 254 in the attributes table 240. In this example, the most popular (e.g., high count return) device locations 254 may be used as the current user location. Other devices and sensors in the home 100 may be used to determine the location of a user. For example, the smart circuit breaker box 116 may provide electrical current information (e.g., amperes per circuit) to the central controller 60, and the location of one or more users may be inferred based on the areas in the home 100 as a function of relative changes in power consumption (i.e., higher power consumption may imply that more devices are in use by users in an area).

At stage 330, the central controller 60 determines one or more notification devices based on the location of the user, wherein each notification device is associated with one or more device attributes. The location attribute of the user determined at stage 329 may be used to select one or more potential notification devices based on the current user location as compared to the location attributes of the devices. For example, the central controller 60 may query the attribute table 240 based on the user location 234 as compared to the device location 254. The query parameters may include a range function such that devices within a range threshold (e.g., 15 m) of the user location may be selected. In an example, other rules or constraints on the central controller 60 or on other network devices, may be used to determine the one or more notification device. For example, a rules engine may be programmed to return a list of devices based on a room identification value attribute (e.g., 'family room,' 'kitchen,' 'office,' etc.). In this example, the rules engine may select devices in the same or adjoining rooms that are proximate to the user.

At stage 332, the central controller 60 determines one or more notification preferences associated with the user. The central controller 60 may query a preference table 270 based on the user identification 278 and one or more device identification values 280 to determine one or more notification preference values (e.g., priority preference value 282, privacy preference 284, display area preference 286, display style preference 288, wake-up preference 290, and others). The central controller 60 may generate one or more alert messages based on the notification preference values. For example, the central controller 60 may generate an alert message for display on the gaming console 118. In another example, the central controller 60 may generate an alert message to be forwarded to another device by the gaming console 118. In this example, the younger children 136*a-b* may instruct the gaming console 118 to send a message to the elder child 134 who may be notified via the television 114. The gaming console 118 may query the central controller 60 for information regarding the location of the elder child 134, and the central controller 60 may generate an alert message containing attributes and preferences associated with the elder child 134 (e.g., the user identification 278) and the television 114 (e.g., the device identification 280). In another example, the attributes and preferences tables 220, 240, 270 may persist on the gaming console 118 (and/or other devices) and the alert message generated on the central controller 60 only includes a location attribute for the elder child 134

At stage 334, the central controller 60 sends an alert message to one or more notification devices based on the notification preferences and the device attributes. The central controller 60 may utilize MAC data frames, or other data fields, in a wireless messaging protocol to generate and then send alert messages containing one or more preference and attribute values (e.g., values from the attribute and preference tables 220, 240, 270). The alert message may, for example, provide instructions to enable the gaming console 118 and/or the television 114 to display a user notification in a user notification area based on the value of display area preference 286 in the alert message. The automobile 22 may be configured present an audio notification based on a user preference value (e.g., text-to-speech voice/style preferences). If multiple devices identifications 280 are selected, the central controller 60 may generate multiple alert messages based on the priority preference values 282, or other rules and constraints available to the central controller 60.

Figures 13A, 13B:
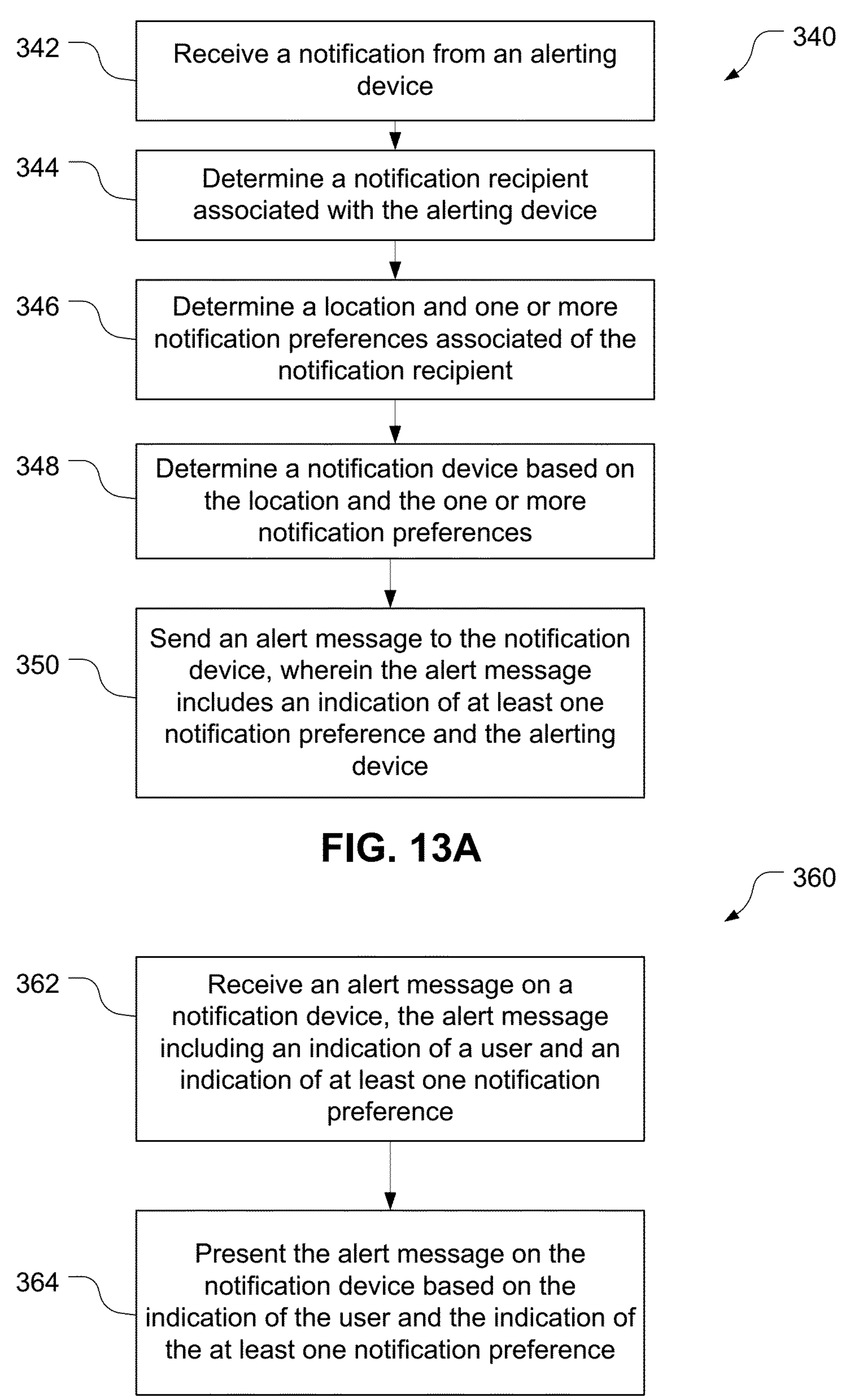
FIG. 13A is a block flow diagram of a method of sending an alert message with a notification preference.
FIG. 13B is a block flow diagram of a method of receiving an alert message with a notification preference.

Referring to FIG. 13A, with further reference to FIGS. 1-10C, a method 340 of sending an alert message with a notification preference includes the stages shown. The method 340 is, however, an example only and not limiting. The method 340 can be altered, e.g., by having stages added, removed, rearranged, combined, performed concurrently, and/or having single stages split into multiple stages.

At stage 342, the central controller 60 receives a notification from an alerting device. The alerting device may be a device 70 such as an appliance (e.g., dish washer 40, oven 41, toaster 42, refrigerator 43), or other device in the home 100 (e.g., charging station 111, automobile 22, gaming console 118, mobile device 140). The alerting device may be remote server 30 that is operably connected to the central controller 60 via a network 28. A remote server 30 may include an email/messaging server, medical alert system, security system, financial services, or other applications configured to provide notifications to one or more users. The central controller 60 may be configured to receive and process the notification in a first-in-first-out order of operation. The central controller 60 may store the received notification in a file system for subsequent processing based on pre-established rules (e.g., concurrent notifications may be prioritized based on alerting device types).

At stage 344, the central controller 60 determines a notification recipient associated with the alerting device. The notification recipient may be a single user or a user group and may be identified by information within the notification (e.g., email address(es), user name(s), telephone number(s)). The central controller 60 is configured to parse the user information from the received notification. In an example, the central controller 60 may include a look-up table including potential alerting device types and a corresponding user information. For example, devices associated with the operation of the home 100 (e.g., appliances, air handling, sump pumps, etc.) may be associated with the spouse 132 such that the spouse 132 will be the notification recipient for all notifications received from those alerting devices.

At stage 346, the central controller 60 determines a location and one or more notification preferences associated with the notification recipient. The central controller 60 may query the attribute and preference tables 220, 270 based on the user identification values 234, 278 and the start time value 228. The query results may include one or more potential user locations 234. At stage 348, the central controller determines a notification device based on the location and the one or more notification preferences. The results of the query at stage 346 may include a subset of potential notification devices (e.g., the union of the records including the device identification values 236, 280 and the user identifications 232, 278), and the corresponding preferences from the preference table 270. The subset of potential notification devices may be further narrowed based on preference values (e.g., priority preference value 282, privacy preference 284, and other constraints). In an example, the priority preference value 282 may include a value to indicate that a corresponding device should receive all notifications (e.g., regardless of the user's location). Conversely, the priority preference value 282 may indicate that a device should not receive an alert message even if the device is collocated with (e.g., proximate to) the user. Other constraints may be placed on the query results based on the content of the received notification and the capabilities of the potential notification devices. The central controller 60 may generate one or more alert messages based on the notification device, or devices, determined at stage 348. The alert messages may utilize an appropriate network protocol (e.g., WI-FI, BLUETOOTH) based on the respective capabilities of the notification devices.

At stage 350, the central controller 60 sends an alert message to the notification device, wherein the alert message includes an indication of at least one notification preference and the alerting device. The central controller 60 may utilize network transport protocols associated with the devices on the system 10 to provide an alert message containing information associated with the attribute and preference values determined at stage 346. If more than one notification device is determined at stage 348, the central controller 60 may send alert messages based on the location of the user (e.g., to the closest device), in an order based on a preference value (e.g., priority), based on the capabilities of the device (e.g., display/audio), or combinations thereof. The alert message includes an indication of the alerting device. For example, referring to FIG. 7B, if the alerting device is a sump pump, the alert message will include information to enable the television 114 (or other devices) to display a balloon feature such as the triangle shape 172, with the notification text to indicate a 'Sump pump Malfunction.' The balloon feature may be based on a display style preference value 288 and the 'sump pump' text may be based on the notification received at stage 342. The central controller 60 may also configure the alert message to be a pending-notification message configured to activate a user specific icon on a device such that the icon shape is based on the alerting device (e.g., home appliances have triangle icons, received messages have envelop icons, medical alerts have red-cross icons, etc.).

Referring to FIG. 13B, with further reference to FIGS. 1-10C, a method 360 of receiving an alert message with a notification preference includes the stages shown. The method 360 is, however, an example only and not limiting. The method 360 can be altered, e.g., by having stages added, removed, rearranged, combined, performed concurrently, and/or having single stages split into multiple stages.

At stage 362, a device 70 receives an alert message including an indication of a user and an indication of at least one notification preference. The device 70 may receive the alert message from the central controller 60 or another device in a network. The alert message may be included in network transport protocols associated with other the devices in the network (e.g., WI-FI, BLUETOOTH) and may contain information associated with the user from the attribute and preference tables, 220, 270. For example, referring to FIGS. 4 and 7A, the television 114 may receive an alert message for the user 130 that is to be displayed in the first user notification area 158. The alert message may include an indication of the user identification 278 (e.g., corresponding to the user 130) and an indication of the display area preference 286. Other attributes and preferences values may be included in the alert message. In another example, the networked speaker device 112 may receive an alert message indicating a notification for the spouse 132 (i.e., the indication of the user) that should be presented as a speaking message via a text-to-speech process (i.e., the one notification preference). Other notification preferences for other devices may also be used.

At stage 364, the device 70 presents the alert message based on the indication of the user and the indication of the at least one notification preference. Continuing the examples from above, the television 114 may display a notification based on the alert message in the designated user notification area (e.g., the first user notification area 158). The television 114 may include additional rules or constraints based on the received attributes and preferences. For example, the television 114 may utilize the indication of the user to execute a routine to determine if there are any other individuals in the family room 104 and then not display the notification if other individuals are present. That is, the user 130 may have enabled a preference on the television 114 to hide all messages if others are present in the family room 104. In this example, the television may display a pending-notification icon associated with the indication of the user in the icon display area 157 rather than present the notification in the first user notification area 158. A networked speaker device 112 such as the Amazon ECHO may be configured to utilize the indication of the user to announce the user's name when the alert message is received. The notification preference in the alert message may configure the networked speaker device 112 to ask for the user's verbal consent before presenting a text-to-speech version of the alert message. Other device configurations and capabilities may be activated based on the content of the received alert message.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of providing an alert to a user, the method comprising:

receiving, at an apparatus, a first indication of a location associated with a first device that is a wireless communication device;

receiving, at the apparatus and from the first device, a notification indicating a status associated with an operation of the first device;

producing, at the apparatus, an alert message including a second indication of the location associated with the first device based at least in part on the first indication of the location associated with the first device; and sending, from the apparatus, the alert message to a second device that is separate from the first device, wherein the alert message, based on at least one preference of the user, includes the notification received from the first device.

2. The method of claim 1, further comprising receiving, at the apparatus from the second device, a location request for the location associated with the first device, wherein producing the alert message comprises producing the alert message in response to receiving the location request.

3. The method of claim 1, wherein the second indication of the location associated with the first device includes a latitude value and a longitude value.

4. The method of claim 1, wherein the second indication of the location associated with the first device includes an east value and a north value.

5. A method of providing an alert to a user, the method comprising:

receiving, at an apparatus, a first indication of a first location associated with a first device that is a wireless communication device;

producing, at the apparatus, a first alert message including a second indication of the first location associated with the first device based at least in part on the first indication of the first location associated with the first device;

sending, from the apparatus, the first alert message to a second device that is separate from the first device, wherein the first alert message, based on at least one preference of the user, includes a notification received from the first device;

receiving, at the apparatus, a first indication of a second location associated with the first device, the second location being different from the first location;

producing, at the apparatus in response to receiving the first indication of the second location associated with the first device and in response to the second location being different from the first location, a second alert message including a second indication of the second location associated with the first device based at least in part on the first indication of the second location associated with the first device; and sending, from the apparatus, the second alert message to the second device.

6. An apparatus comprising:

a memory;

at least one transceiver; and at least one processor communicatively coupled to the memory and the at least one transceiver, and configured to:

receive, via the at least one transceiver, a first indication of a location associated with a first device that is a wireless communication device;

receive, via the at least one transceiver and from the first device, a notification indicating a status associated with an operation of the first device;

produce an alert message including a second indication of the location associated with the first device based at least in part on the first indication of the location associated with the first device; and send, via the at least one transceiver, the alert message to a second device that is separate from the first device, wherein the alert message, based on at least one preference of a user, includes the notification received from the first device.

7. The apparatus of claim 6, wherein the at least one processor is further configured to receive, from the second device, a location request for the location associated with the first device, wherein the at least one processor is configured to produce the alert message in response to receiving the location request.

8. The apparatus of claim 6, wherein the second indication of the location associated with the first device includes a latitude value and a longitude value.

9. The apparatus of claim 6, wherein the second indication of the location associated with the first device includes an east value and a north value.

10. An apparatus comprising:

a memory;

at least one transceiver; and at least one processor communicatively coupled to the memory and the at least one transceiver, and configured to:

receive, via the at least one transceiver, a first indication of a first location associated with a first device that is a wireless communication device;

produce a first alert message including a second indication of the first location associated with the first device based at least in part on the first indication of the first location associated with the first device;

send, via the at least one transceiver, the first alert message to a second device that is separate from the first device, wherein the first alert message, based on at least one preference of a user, includes a notification received from the first device;

receive, via the at least one transceiver, a first indication of a second location associated with the first device, the second location being different from the first location;

produce, in response to receiving the first indication of the second location associated with the first device and in response to the second location being different from the first location, a second alert message including a second indication of the second location associated with the first device based at least in part on the first indication of the second location associated with the first device; and send, via the at least one transceiver, the second alert message to the second device.

11. A non-transitory processor-readable storage medium comprising processor-readable instructions configured to cause one or more processors of an apparatus, for providing an alert to a user, to:

receive a first indication of a location associated with a first device that is a wireless communication device;

receive, from the first device, a notification indicating a status associated with an operation of the first device;

produce an alert message including a second indication of the location associated with the first device based at least in part on the first indication of the location associated with the first device; and send the alert message to a second device that is separate from the first device, wherein the alert message, based on at least one preference of the user, includes the notification received from the first device.

12. The non-transitory processor-readable storage medium of claim 11, further comprising processor-readable instructions configured to cause the one or more processors to receive, from the second device, a location request for the location associated with the first device, wherein the processor-readable instructions configured to cause the one or more processors to produce the alert message comprise processor-readable instructions configured to cause the one or more processors to produce the alert message in response to receiving the location request.

13. The non-transitory processor-readable storage medium of claim 11, wherein the second indication of the location associated with the first device includes a latitude value and a longitude value.

14. The non-transitory processor-readable storage medium of claim 11, wherein the second indication of the location associated with the first device includes an east value and a north value.

15. A non-transitory processor-readable storage medium comprising processor-readable instructions configured to cause one or more processors of an apparatus, for providing an alert to a user, to:

receive a first indication of a first location associated with a first device that is a wireless communication device;

produce a first alert message including a second indication of the first location associated with the first device based at least in part on the first indication of the first location associated with the first device;

send the first alert message to a second device that is separate from the first device, wherein the first alert message, based on at least one preference of the user, includes a notification received from the first device;

receive a first indication of a second location associated with the first device, the second location being different from the first location;

produce, in response to receiving the first indication of the second location associated with the first device and in response to the second location being different from the first location, a second alert message including a second indication of the second location associated with the first device based at least in part on the first indication of the second location associated with the first device; and send the second alert message to the second device.

* * * * *